US012805690B2

(12) United States Patent
Wells et al.

(10) Patent No.: US 12,805,690 B2
(45) **Date of Patent: *Nov. 24, 2026**

(54) CLEANING WIPE

(71) Applicant: The Procter & Gamble Company, Cincinnati, OH (US)

(72) Inventors: Agnes Elaine Wells, Cincinnati, OH (US); Nayda Liz Ramos Medina, Green Township, OH (US); Nicola John Policicchio, Mason, OH (US); Brian Lee Keith, Hamersville, OH (US); Terra Louise Dent, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 477 days.

This patent is subject to a terminal disclaimer.

(21) Appl. No.: 18/480,589

(22) Filed: Oct. 4, 2023

(65) Prior Publication Data

US 2024/0115102 A1 Apr. 11, 2024

(30) Foreign Application Priority Data

Oct. 6, 2022 (EP) .................................... 22199948

(51) Int. Cl.
*A47L 13/16* (2006.01)
*A47L 13/20* (2006.01)

(52) U.S. Cl.
CPC ............... *A47L 13/16* (2013.01); *A47L 13/20* (2013.01); *B32B 2432/00* (2013.01)

(58) Field of Classification Search
CPC ........ A47L 13/16; A47L 13/20; A47L 13/255; A47L 13/38; B32B 2432/00
See application file for complete search history.

(56) References Cited

U.S. PATENT DOCUMENTS 5,146,651 A 9/1992 Duffy et al.
7,003,856 B2 2/2006 Hayashi et al.
(Continued)

FOREIGN PATENT DOCUMENTS

WO 02053003 A2 7/2002
WO WO 2006/070502 A1 * 7/2006 ............. A47L 13/16
(Continued)

OTHER PUBLICATIONS

16378 PCT Search Report and Written Opinion for PCT/US2023/075795 dated Jan. 26, 2024, 11 pages.
(Continued)

*Primary Examiner* — Laura C Guidotti
(74) *Attorney, Agent, or Firm* — Gary J. Foose

(57) ABSTRACT

A cleaning wipe including a first nonwoven having a plurality of first nonwoven strips, a second nonwoven having a plurality of second nonwoven strips, a third nonwoven having a plurality of third nonwoven strips, and a fourth nonwoven having a plurality of fourth nonwoven strips. The cleaning wipe includes a central bonded portion and the fourth nonwoven is further joined to the third nonwoven by a pair of outboard bonds. More than about 10% of the second nonwoven strips are bent so that the free ends of the second nonwoven strips are bent out of plane relative to the fixed ends of the second nonwoven strips.

18 Claims, 7 Drawing Sheets

(56) References Cited

U.S. PATENT DOCUMENTS

| | | | |
|---|---|---|---|
| 8,146,197 B2 | 4/2012 | Yamada | |
| 8,225,453 B2 | 7/2012 | Yamada | |
| 8,245,349 B2 | 8/2012 | Tsuchiya et al. | |
| 8,341,797 B2 | 1/2013 | Young | |
| 8,763,197 B2 | 7/2014 | Policicchio et al. | |
| 8,851,776 B2 | 10/2014 | Schwarz et al. | |
| 9,021,647 B2 | 5/2015 | Gummow et al. | |
| 9,185,969 B2 | 11/2015 | Takahashi et al. | |
| 9,242,826 B2 | 1/2016 | Bando et al. | |
| 9,533,822 B2 | 1/2017 | Policicchio | |
| 9,833,118 B2 | 12/2017 | Policicchio | |
| 9,849,638 B2 | 12/2017 | Broad et al. | |
| 9,919,501 B2 | 3/2018 | Matsumoto et al. | |
| 10,098,516 B2 | 10/2018 | Takahashi et al. | |
| 10,595,701 B2 * | 3/2020 | Yamada | A47L 13/38 |
| 10,610,078 B2 | 4/2020 | Oliveira | |
| 10,694,915 B2 | 6/2020 | Policicchio et al. | |
| 2002/0146956 A1 | 10/2002 | Ngai | |
| 2002/0148061 A1 | 10/2002 | Tanaka | |
| 2004/0166756 A1 | 8/2004 | Kurihara et al. | |
| 2006/0143847 A1 | 7/2006 | Vinson et al. | |
| 2010/0319152 A1 | 12/2010 | Prizepasniak | |
| 2011/0041274 A1 | 2/2011 | Ogale | |
| 2011/0088189 A1 | 4/2011 | Wada et al. | |
| 2011/0277258 A1 | 11/2011 | Otsuka et al. | |
| 2012/0311803 A1 | 12/2012 | Yamada | |
| 2013/0256169 A1 | 10/2013 | Bando et al. | |
| 2013/0291486 A1 | 11/2013 | Shinomori et al. | |
| 2013/0298738 A1 | 11/2013 | Bando et al. | |
| 2014/0115917 A1 | 5/2014 | Yamada | |
| 2014/0182767 A1 | 7/2014 | Goto et al. | |
| 2014/0182779 A1 | 7/2014 | Yamashita et al. | |
| 2015/0000048 A1 | 1/2015 | Miracle | |
| 2015/0047994 A1 | 2/2015 | Hughes | |
| 2015/0266633 A1 | 9/2015 | Cameron et al. | |
| 2018/0289234 A1 | 10/2018 | Policicchio et al. | |
| 2019/0234023 A1 | 8/2019 | Pratt et al. | |
| 2019/0298140 A1 | 10/2019 | Policicchio | |
| 2024/0115101 A1 * | 4/2024 | Wells | A47L 13/38 |
| 2024/0115103 A1 * | 4/2024 | Policicchio | A47L 13/20 |

FOREIGN PATENT DOCUMENTS

| | | |
|---|---|---|
| WO | 2014177369 A1 | 11/2014 |
| WO | 2015110444 A1 | 7/2015 |
| WO | 2017003652 A1 | 1/2017 |
| WO | 2017131852 A1 | 8/2017 |

OTHER PUBLICATIONS

16378F Extended EP Search Report and Opinion for 22199948.5 dated Mar. 31, 2023 , 9 pages.

All Office Actions; U.S. Appl. No. 18/480,595, filed on Oct. 4, 2023.

All Office Actions; U.S. Appl. No. 18/480,585, filed on Oct. 4, 2023.

All Office Actions: U.S. Appl. No. 18/480,591, filed on Oct. 4, 2023.

U.S. Unpublished U.S. Appl. No. 18/480,585, filed on Oct. 4, 2023, to Agnes Elaine Wells et al.

U.S. Unpublished U.S. Appl. No. 18/480,591, filed on Oct. 4, 2023, to Nicola John Policicchioet. al.

U.S. Unpublished U.S. Appl. No. 18/480,595, filed on Oct. 4, 2023, to Terra Louise Dent et al.

All Office Actions; U.S. Appl. No. 19/090,080, filed on Mar. 25, 2025.

U.S. Unpublished U.S. Appl. No. 19/090,080, filed on Mar. 25, 2025, to Agnes Elaine Wells et al.

* cited by examiner

CLEANING WIPE

FIELD OF THE INVENTION

Cleaning wipes for floors.

BACKGROUND OF THE INVENTION

A variety of disposable and washable floor cleaning wipes are available to consumers. These cleaning wipes are typically a built up laminate of various layers. These layers are typically flat webs of material devoid of discontinuities. In use, the user applies some cleaning liquid to the floor and the layer that contacts the floor is used to scrub and mop the floor. The floor contacting layer can be hydrophilic so that the layer has the ability to acquire spent cleaning liquid from the floor. Some cleaning wipes include an absorbent core. The floor contacting layer can transport the soiled cleaning liquid to the absorbent core.

A typical household has a variety of floor surfaces. Some surfaces such has hardwood or synthetic hardwood are smooth or may have some light texture. Tile surfaces can likewise be smooth or textured and there can be relief at the locations of the grout between the tiles. Concrete and decorative concrete and similar materials can also be provided with a variety of surface textures. Cleaning wipes that are constructed from laminates of layers of fibrous materials may not provide a sufficiently topographically varying floor contacting layer of the cleaning wipe enable the cleaning wipe to clean in the valleys of the surface texture of the floor. When an inadequately conforming cleaning wipe is used to clean a floor, the results are often unsatisfactory since detritus may be left in the valleys of the surface texture of the floor.

With the above limitation in mind, there is a continuing unaddressed need for multilayer cleaning wipes that are useful for cleaning of floor surfaces having a variety of surface textures.

SUMMARY OF THE INVENTION

A cleaning wipe having a longitudinal axis extending between opposing transverse edges that cross the longitudinal axis and longitudinal edges spaced apart from the longitudinal axis and extending between the transverse edges, wherein the cleaning wipe comprises: a first nonwoven extending along the longitudinal axis and comprising a plurality of first nonwoven strips extending from first nonwoven fixed ends, wherein the first nonwoven fixed ends are oriented towards the longitudinal axis; a second nonwoven extending along the longitudinal axis, wherein the second nonwoven is joined to the first nonwoven along a central bonded portion and comprises a plurality of second nonwoven strips extending from second nonwoven fixed ends to second nonwoven free ends, wherein the second nonwoven fixed ends are oriented towards the longitudinal axis, wherein along the central bonded portion the second nonwoven is below the first nonwoven; a third nonwoven extending along the longitudinal axis, wherein the third nonwoven is joined directly or indirectly to the second nonwoven along the central bonded portion and comprises a plurality of third nonwoven strips extending from third nonwoven fixed ends, wherein the third nonwoven fixed ends are oriented towards the longitudinal axis, and wherein along the central bonded portion the second nonwoven is between the first nonwoven and the third nonwoven; and a fourth nonwoven extending along the longitudinal axis, wherein the fourth nonwoven is joined to the third nonwoven along the central bonded portion and comprises a plurality of fourth nonwoven strips extending from fourth nonwoven fixed ends, wherein the fourth nonwoven fixed ends are oriented towards the longitudinal axis L, and wherein along the central bonded portion the third nonwoven is between the second nonwoven and the fourth nonwoven, wherein the fourth nonwoven is further joined to the third nonwoven by a pair of outboard bonds that are outboard of the central bonded portion on opposite sides of the longitudinal axis, wherein the outboard bonds extend between the transverse edges; wherein more than about 10% by number of the second nonwoven strips are bent so that the second nonwoven free ends are out of plane relative to the second nonwoven fixed end.

DETAILED DESCRIPTION OF THE INVENTION

Figure 1:
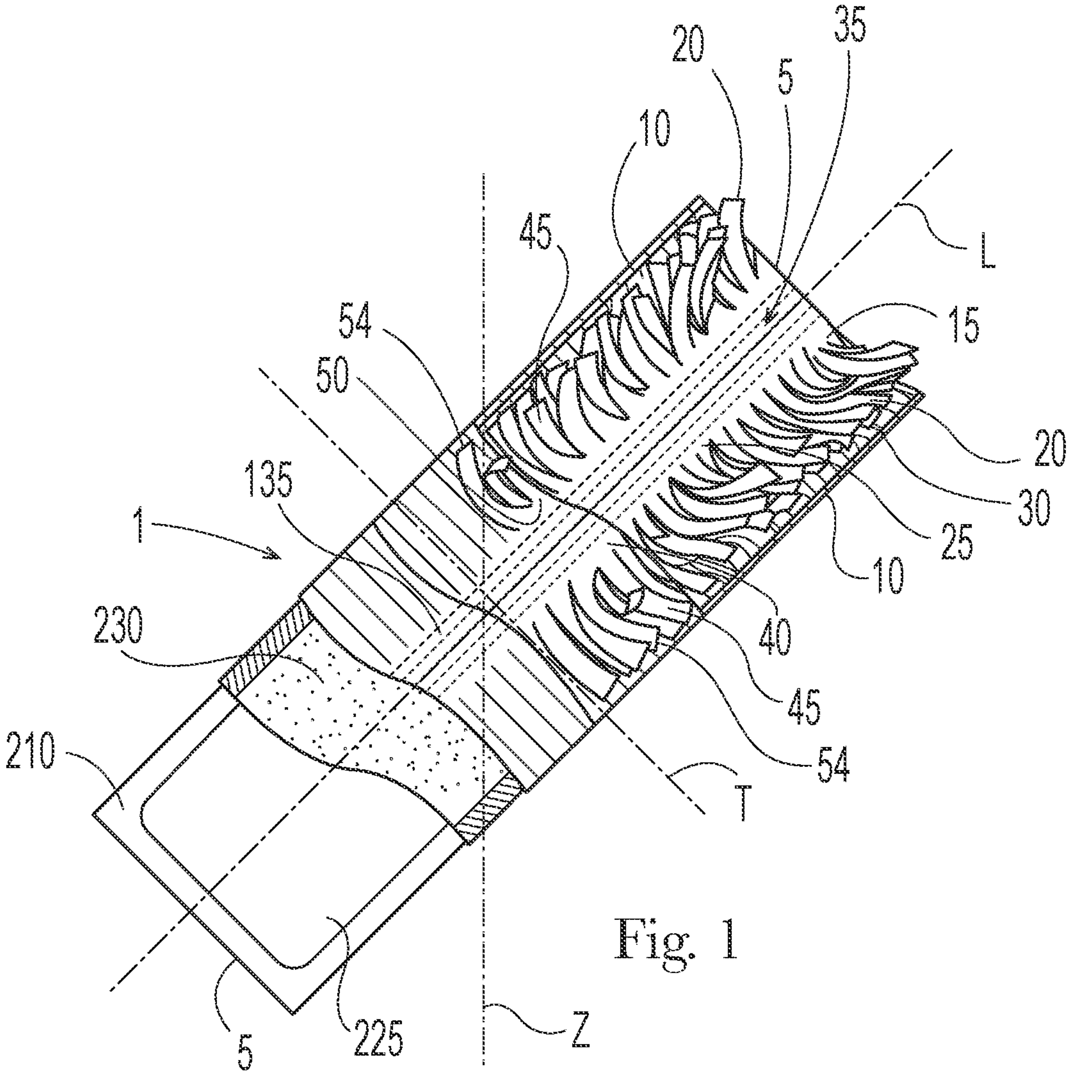
FIG. 1 is a perspective view a cleaning wipe with various sections removed so that underlying structures are visible.

A top perspective sectional view of a cleaning wipe 1 is shown in FIG. 1. The top of the cleaning wipe 1 is considered herein to be the side of the cleaning wipe 1 that contacts the floor in use. The cleaning wipe 1 can have a longitudinal axis L extending between opposing transverse edges 5 that cross the longitudinal axis L. The cleaning wipe 1 can have longitudinal edges 10 spaced apart from the longitudinal axis L and extending between the transverse edges 5. The cleaning wipe 1 can have a transverse axis T orthogonal to the longitudinal axis L. The cleaning wipe 1 can be generally planar in that the cleaning wipe 1 can be more extensive along the longitudinal axis L and transverse axis T than along the z-axis, the z-axis being orthogonal to the longitudinal axis L and transverse axis T.

The cleaning wipe 1 can have a length along the longitudinal axis L from about 0.1 m to about 1 m, optionally from about 0.2 m to about 0.6 m. The cleaning wipe 1 can have a width orthogonal to the longitudinal axis L from about 0.1 m to about 0.3 m, optionally from about 0.1 m to about 0.2 m. In general, the cleaning wipe 1 is a planar object in that the lateral dimensions of length and width are substantially greater than the thickness, notwithstanding the three-dimensionality of the substrates themselves and the deformed and or overlapping strips described herein The longitudinal edges 10 can be straight, curved, wavy, jagged, stepped, or other shape that can be practically cut. The planar shape of the cleaning wipe 1 can be rectangular, substantially rectangular, or other generally planar shape that is practical for being used to wipe a floor.

The cleaning wipe 1 can be removably attached to a cleaning implement having a head and pole pivotably attached to the head. The user can attach the cleaning wipe 1 to the head and then push the cleaning wipe 1 across the floor with the pole.

The cleaning wipe 1 can comprise a first nonwoven 15 extending along the longitudinal axis L. The first nonwoven 15 can extend entirely or partially along the longitudinal axis L. The first nonwoven 15 can also extend entirely or partially across the width of the cleaning wipe 1. The first nonwoven 15 can comprise a plurality of first nonwoven strips 20 extending from first nonwoven fixed ends 25 oriented towards the longitudinal axis L to first nonwoven free ends 30. The first nonwoven fixed ends 25 directly opposite one another on opposing sides of the longitudinal axis L can be from about 15 mm to about 60 mm apart, optionally from about 25 mm to about 40 mm apart when the first nonwoven strips 20 are extended in plane.

The cleaning wipe 1 can further comprise a second nonwoven 40 joined to the first nonwoven 15 along a central bonded portion 35. The second nonwoven 40 can comprise a plurality of second nonwoven strips 45 extending from second nonwoven fixed ends 50 oriented towards the longitudinal axis L to second nonwoven free ends 54. Along the central bonded portion 35, the second nonwoven 40 is below the first nonwoven 15. The second nonwoven fixed ends 50 directly opposite one another on opposing sides of the longitudinal axis L can be from about 15 mm to about 60 mm apart, optionally from about 25 mm to about 40 mm apart.

The first nonwoven fixed ends 25 and second nonwoven fixed ends 50 can be outboard of the central bonded portion 35. Optionally, the first nonwoven fixed ends 25 and second nonwoven fixed ends can be spaced apart from the central bonded portion 35.

The central bonded portion 35 can extend through first nonwoven 15 and the second nonwoven 40. The central bonded portion 35 can extend through the thickness of the first nonwoven 15 and the second nonwoven 40, the thickness being parallel to the z-axis Z. The central bonded portion 35 can be a continuous or intermittent thermal bond and or chemical bond and or pattern of thermal or chemical bonds extending in a direction generally along, along, parallel to, generally coincident with, or coincident with the longitudinal axis L, optionally along the longitudinal axis L. Thermal bonds include ultrasonic bonds. The central bonded portion 35 or portion thereof can be between the first nonwoven 15 and the second nonwoven 40.

Parts of the first nonwoven strips 20 and the second nonwoven strips 45 can planarly extend in opposite directions away from a central bonded portion 35 along the longitudinal axis L. That is, the first nonwoven strips 20 and the second nonwoven strips 45 can flank the central bonded portion 35 along the longitudinal edges 10. The first nonwoven strips 20 and second nonwoven strips 45 can be individually flat digits or flat fingers of the first nonwoven 15 and second nonwoven 40, respectively, that can partially extend in direction away from the longitudinal axis L towards one of the longitudinal edges 10. These flat digits or fingers, which are deformable, can be bent, twisted, or otherwise deformed to provide for greater three dimensionality to the respective nonwoven. That is, what is in all practicality a flat essentially two dimensional nonwoven web of the first nonwoven 15 and second nonwoven 40, notwithstanding the thickness, can be transformed into a bulkier, fluffier, three dimensional structure. These digits or fingers can sweep or mop the floor and acquire detritus and or liquid when the cleaning wipe 1 is in use. The individual first nonwoven strips 20 and second nonwoven strips 45 can be independently movable relative to other first nonwoven strips 20 so as to be able to individually at least partially conform to parts of the surface of the floor having an irregular surface topography. With a multitude of strips sweeping or mopping the floor, there is a high probability that most, nearly all, or all portions of the floor will be contacted by at least one if not a plurality of strips when the cleaning wipe 1 is used.

Fluffier cleaning wipes 1 may be able to better partially conform to parts of the surface of the floor having an irregular surface topography. To provide such fluffiness, more than about 10%, optionally more than about 20%, optionally more than about 30%, optionally more than about 50%, optionally more than about 70%, by number of the second nonwoven strips 45 can be bent so that the second nonwoven free ends 54 are out of plane relative to the second nonwoven fixed ends 50. Optionally, more than about 10%, optionally more than about 20%, optionally more than about 30%, optionally more than about 50%, optionally more than about 70%, by number of the second nonwoven strips 45 can be interlaced with the first nonwoven strips 20 so that portions of the second nonwoven strips 45 are above portions of the first nonwoven strips 20. Likewise, more than about 10%, optionally more than about 20%, optionally more than about 30%, optionally more than about 50%, optionally more than about 70%, by number of the first nonwoven strips 20 can be bent so that the first nonwoven free ends 30 are out of plane relative to the first nonwoven fixed ends 25 to provide for fluffiness to the cleaning wipe 1.

Bending the second nonwoven strips 45 and or interlacing the first nonwoven strips 20 and the second nonwoven strips 45 transforms the cleaning wipe 1 into a fluffier condition as compared to a cleaning wipe 1 in which the essentially flat two dimensional nonwoven substrates remain flat in use. Bending and or interlacing brings some portions of some of the second nonwoven strips 45 to the top of the cleaning wipe 1, the top being the side of the cleaning wipe 1 that contacts the floor in use. Moreover, bending and or interlacing can position some portions of some of the first nonwoven strips 20 below second nonwoven strips 45, i.e. more towards the interior of the cleaning wipe 1. Bent and or interlaced strips can have portions that overlap and or underlap strips of the layer or layers nearby. Bending the first nonwoven strips 20 can similarly fluff the cleaning wipe 1 by transforming a flat first nonwoven 15 into a more three-dimensional structure.

In practice, the first nonwoven 15 and second nonwoven 40 are formed from a flat essentially two dimensional webs of nonwoven. The strips can be formed by cutting slits in the longitudinal edges 10 of the first nonwoven 15 and second nonwoven 40. Since the strips have fixed ends and are in all practicality two dimensional structures, notwithstanding the thickness of the nonwovens, some degree of bending and or twisting and or folding and or crinkling and or pleating and or stretching of parts of the first nonwoven strips 20 and or second nonwoven strips 45 near their respective fixed ends can accompany fluffing of the cleaning wipe 1 and or interlacing of the strips.

The bending and or interlacing may be an interweaving of one or more first nonwoven strips 20 with one or more nearby second nonwoven strips 45. The bending and or interlacing may be bending or twisting or folding of the strips of one nonwoven in directions such that intermingle with bends, twists, or folds of nearby strips of the other or another nonwoven. The strips may even be back bent so that the free ends thereof are oriented back towards the longitudinal axis L. Some of the strips may even be angularly bent so that the free ends thereof are oriented towards one of the transverse edges 5 of the cleaning wipe 1 or towards a position somewhere between being oriented towards the longitudinal axis L or away from the longitudinal axis L. Bending and or interlacing can be provided by double folds, bends, twists, and the like of the strips. The bending and or interlacing can bring parts of strips of interior layers of the cleaning wipe 1 out towards the top surface of the cleaning wipe 1 that contacts the floor in use.

The first nonwoven fixed ends 25 can be registered with the second nonwoven fixed ends 50. This arrangement can be practical in that the strips of the individual nonwovens can be formed by a single cutting knife or laser that passes through the multiple layers of nonwovens arranged in a stack.

The first nonwoven strips 20 can extend further away from or be extendable further away from the longitudinal axis L or be longer than the second nonwoven strips 20. This can provide for a greater propensity for first nonwoven strips 20 to contact the floor as compared to second nonwoven strips 45 yet still provide for adequate fluffing when the first nonwoven strips 20 are bent and or interlaced with the second nonwoven strips 45.

Optionally, the first nonwoven strips 20 and the second nonwoven strips 45 can be coextensive or coextendable with one another with respect to the longitudinal axis L. This can increase the contribution of the second nonwoven strips 45 to cleaning as compared to an arrangement in which the first nonwoven strips 20 extend further away from the longitudinal axis L than the second nonwoven strips 45.

The greater the fraction of bending and or interlacing of the first nonwoven strips 20 and the second nonwoven strips 45 the greater the amount of fluffing or bulking of the cleaning wipe 1. From about 30% to about 95%, optionally about 50% to about 95%, by number of the second nonwoven strips 45 can be bent and or interlaced with the first nonwoven strips 20 so that portions of the second nonwoven strips 45 are above portions of the first nonwoven strips 20. For example, if the second nonwoven 40 has 80 second nonwoven strips 45, 40 of them being along one longitudinal edge 10 and the other 40 being along the other longitudinal edge 10, and 60 of the second nonwoven strips 45 are bent and or interlaced with the first nonwoven strips 20, then 75% by number of the second nonwoven strips 45 are bent and or interlaced with the first nonwoven strips 20.

The strips per se can be further bulked up and formed into loop structures by gate folds in one or more of the first nonwoven 15 and second nonwoven 40. A gate fold can be thought of as a flat substrate that is provided with two parallel folds to create three panels and the two gate panels are approximately half the width of the central panel and are inwardly folded towards one another, optionally towards one another on the same side of the central panel. Without being bound by theory, gate folds may be more easily controlled in the converting process than serpentine folds, c-folds, or z-folds since for a gate fold, both longitudinal edges 10 are defined by a fold line of the respective nonwoven rather than a free edge. For a serpentine fold, c-fold, or z-fold, the longitudinal edges 10 include a free edge that may make the nonwoven web more difficult to control precisely.

Optionally, the cleaning wipe 1 can comprise an absorbent core 225 that is between a fluid acquisition layer 230 and a backsheet 210. Optionally, the cleaning wipe 1 can comprise a third nonwoven 135.

Figure 2:
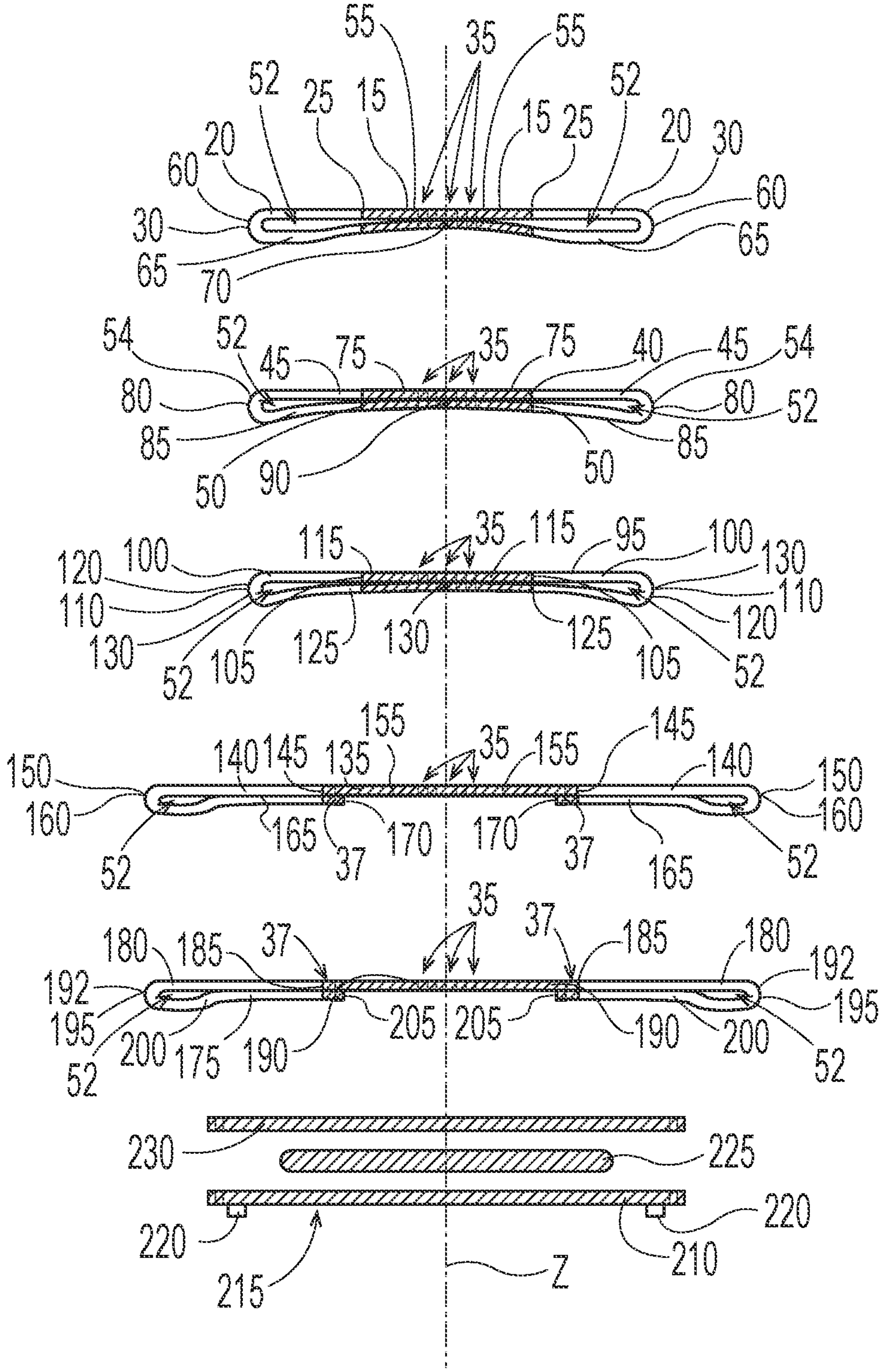
FIG. 2 is an exploded cross sectional view of a cleaning wipe.

A cross section of a cleaning wipe 1 is shown in FIG. 2. The z-axis Z is orthogonal to the longitudinal axis L and transverse axis T and passes through the thickness of the constituent nonwovens of the cleaning wipe 1. The first nonwoven 15 can be gate folded and comprise, or have gate folds 52 comprising, a first nonwoven main portion 55 that extends across the longitudinal axis L, a pair of first nonwoven fold lines 60 on opposite sides of the longitudinal axis L, and a pair of first nonwoven gate portions 65 each of which extend from one of the first nonwoven fold lines 60 towards the central bonded portion 35 and are bonded to the first nonwoven main portion 55. The gate folds 52 in the first nonwoven 15 can provide first nonwoven strips 20 that are flattened, open, deformed, or irregular loops. Interlacing of the second nonwoven strips 45 with the first nonwoven strips 20 can open, partially open, or irregularly deform the loops constituting the first nonwoven strips 20. This can result in more fluffing and bulking of the first nonwoven 15 as compared flat unlooped first nonwoven strips 20. Optionally, the first nonwoven gate portions 65 can be bonded to the first nonwoven main portion 55 outboard of the central bonded portion 35 relative to the longitudinal axis L.

The first nonwoven gate portions 65 can be between the first nonwoven main portion 55 and the second nonwoven 40. This may be a structurally more robust design since the ends of the gate portions may be protected from detaching from the central bonded portion 35 when the cleaning wipe 1 is used on a rough floor surface.

Open or openable loops can be provided as the first nonwoven strips 20 by providing that a portion of the first nonwoven gate portion 65 adjacent the first nonwoven fold line 60 and the first nonwoven main portion 55 are unbonded to one another. Such a structure can be an openable or an open loop.

The first nonwoven gate portions 65 can extend from the first nonwoven fold line 60 to a first nonwoven gate portion end 70. The first nonwoven gate portion ends 70 can be bonded to the first nonwoven main portion 55.

The second nonwoven 40 can be structured similarly to the first nonwoven 15. The second nonwoven 40 can be gate folded and comprise, or have gate folds 52 comprising, a second nonwoven main portion 75 that extends across the longitudinal axis L, a pair of second nonwoven fold lines 80 on opposite sides of the longitudinal axis, and a pair of second nonwoven gate portions 85 each of which extend from one of the second nonwoven fold lines 80 towards the central bonded portion 35 and are bonded to the second nonwoven main portion 75. The gate folds 52 in the second nonwoven 40 can provide second nonwoven strips 45 that are flattened, open, deformed, or irregular loops. Bending and or interlacing of the second nonwoven strips 45 with the first nonwoven strips 20 can open, partially open, or irregularly deform the loops constituting the second nonwoven strips 45. This can result in more fluffing and bulking of the second nonwoven 40 as compared flat unlooped second nonwoven strips 45. Optionally, the second nonwoven gate portions 85 can be bonded to the second nonwoven main portion 75 outboard of the central bonded portion 35 relative to the longitudinal axis L.

The second nonwoven main portion 75 can be between the second nonwoven gate portion 85 and the first nonwoven 15. The second nonwoven main portion 75 can be between the second nonwoven gate portion 85 and the first nonwoven main portion 55. Providing the second nonwoven gate portions 85 folded away from the first nonwoven 15 may reduce the amount of positional control of the various nonwovens needed during manufacture to assemble the cleaning wipe 1. Optionally, the second nonwoven gate portions 85 can be between the second nonwoven main portion 75 and the first nonwoven main portion 55.

Open or openable loops can be provided as the second nonwoven strips 45 by providing that a portion of the second nonwoven gate portion 85 adjacent the second nonwoven fold line 80 and the second nonwoven main portion 75 are unbonded to one another. Such a structure can be an openable or open loop.

The second nonwoven gate portions 85 can extend from the second nonwoven fold line 80 to a second nonwoven gate portion end 90. The second nonwoven gate portion ends 90 can be bonded to the second nonwoven main portion 75.

The first nonwoven strips 20 and second nonwoven strips 45 can have the same shape as one another. Optionally, the first nonwoven strips 20 and the second nonwoven strips 45 can be straight, curved, or a combination thereof.

A bulkier cleaning wipe 1 is possible by adding additional layers to the cleaning wipe 1. For example, the cleaning wipe 1 can further comprise an intermediate nonwoven 95 joined to the second nonwoven 40 along the central bonded portion 35. The intermediate nonwoven 95 can comprise a plurality of intermediate nonwoven strips 100 extending from intermediate nonwoven fixed ends 105 oriented towards the longitudinal axis L to intermediate nonwoven free ends 110. Along the central bonded portion 35, the second nonwoven 40 can be between the first nonwoven 15 and the intermediate nonwoven 95. Along the central bonded portion 35, the intermediate nonwoven 95 can be below the second nonwoven 40. The intermediate nonwoven fixed ends 105 directly opposite one another on opposing sides of the longitudinal axis L can be from about 15 mm to about 60 mm apart, optionally from about 25 mm to about 40 mm apart.

The central bonded portion 35 can extend through the second nonwoven 40 and the intermediate nonwoven 95. The central bonded portion 35 can extend through the first nonwoven 15, second nonwoven 40, and the intermediate nonwoven 95, The central bonded portion 35 can extend through the thickness of the second nonwoven 40 and the intermediate nonwoven 95. The central bonded portion 35 can extend through the thickness of the first nonwoven 15, second nonwoven 40, the intermediate nonwoven 95, the thickness being parallel to the z-axis Z. The central bonded portion 35 can be between the second nonwoven 40 and the intermediate nonwoven 95. The central bonded portion 35 or portion thereof can be between the first nonwoven 15 and the second nonwoven 40 and between the second nonwoven 40 and the intermediate nonwoven 95.

The intermediate nonwoven fixed ends 105 can be outboard of the central bonded portion 35. Optionally, the intermediate nonwoven fixed ends 105 can be spaced apart from the central bonded portion 35.

To provide for a fluffy or bulky cleaning wipe 1, more than about 10%, optionally more than about 20%, optionally more than about 30%, optionally more than about 50%, optionally more than about 70%, by number of the intermediate nonwoven strips 100 can be bent and or interlaced with the second nonwoven strips 45 so that portions of the intermediate nonwoven strips 100 are above portions of the second nonwoven strips 45. Optionally, more than about 30%, or even more than about 50%, or even more than about 70%, by number of the intermediate nonwoven strips 100 can be bent and or interlaced with the second nonwoven strips 45 so that portions of the intermediate nonwoven strips 100 are above portions of the second nonwoven strips 45. The greater the fraction of bent intermediate nonwoven strips 100 and or interlacing of the intermediate nonwoven strips 100 and the second nonwoven strips 45 the greater the amount of fluffing or bulking of the cleaning wipe 1. From about 30% to about 95%, optionally about 30% to about 100%, optionally about 50% to about 95%, optionally about 50% to about 100%, by number of the intermediate nonwoven strips 100 can be bent and or interlaced with the second nonwoven strips 45 so that portions of the intermediate nonwoven strips 100 are above portions of the second nonwoven strips 45.

Each intermediate nonwoven strip 100 can have an intermediate nonwoven fixed end 105 oriented towards the central bonded portion 35 and extend to an intermediate nonwoven free end 110. Some of the intermediate nonwoven free ends 110 can be oriented towards the longitudinal edges 10. To provide for fluffiness, more than about 10%, optionally more than about 20%, optionally more than about 30%, optionally more than about 50%, optionally more than about 70%, by number of the intermediate nonwoven strips 100 can be bent so that the intermediate nonwoven free ends 110 are out of plane relative to the intermediate nonwoven fixed ends 105.

The intermediate nonwoven 95 can be gate folded and comprise, or have gate folds 52 comprising, an intermediate nonwoven main portion 115 that extends across the longitudinal axis L, a pair of intermediate nonwoven fold lines 120 on opposite sides of the longitudinal axis, and a pair of intermediate nonwoven gate portions 125 each of which extend from one of the intermediate nonwoven fold lines 120 towards the central bonded portion 35 and are bonded to the intermediate nonwoven main portion 115. The gate folds 52 in the intermediate nonwoven 95 can provide the intermediate nonwoven strips 100 that are flattened, open, deformed, or irregular loops. Bending and or interlacing of the intermediate nonwoven strips 100 with the second nonwoven strips 45 can open, partially open, or irregularly deform the loops constituting the intermediate nonwoven strips 100. This can result in more fluffing and bulking of the intermediate nonwoven 95 as compared flat unlooped intermediate nonwoven strips 100. Optionally, the intermediate nonwoven gate portions 125 can be bonded to the intermediate nonwoven main portion 115 outboard of the central bonded portion 35 relative to the longitudinal axis L.

The intermediate nonwoven main portion 115 can be between the intermediate nonwoven gate portion 125 and the second nonwoven 40. The intermediate nonwoven main portion 115 can be between the intermediate nonwoven gate portion 125 and the second nonwoven main portion 75. Without being bound by theory, providing the intermediate nonwoven gate portions 125 folded away from the second nonwoven 40 might reduce the amount of positional control of the various nonwovens needed during manufacture to assemble the cleaning wipe 1. Optionally, the intermediate nonwoven gate portions 125 can be between the intermediate nonwoven main portion 115 and the second nonwoven main portion 75.

Open or openable loops can be provided as the intermediate nonwoven strips 100 by providing that a portion of the intermediate nonwoven gate portion 125 adjacent the intermediate nonwoven fold line 120 and the intermediate nonwoven main portion 115 are unbonded to one another. Such a structure can be an openable or open loop.

The intermediate nonwoven gate portions 125 can extend from the intermediate nonwoven fold line 120 to an intermediate nonwoven gate portion end 130. The intermediate nonwoven gate portion ends 130 can be bonded to the intermediate nonwoven main portion 115.

The second nonwoven strips 45 and the intermediate nonwoven strips 100 can have the same shape as one another. Optionally, the first nonwoven strips 20 and second nonwoven strips 45, and intermediate nonwoven strips 100 can have the same shape as one another. Optionally, one or more of the first nonwoven strips 20, the second nonwoven strips 45, and the intermediate nonwoven strips 100 can be straight, curved, or a combination thereof.

The cleaning wipe 1 can further comprise a third nonwoven 135 joined directly or indirectly to the second nonwoven 40 along the central bonded portion 35. The third nonwoven 135 can comprise a plurality of third nonwoven strips 140 extending from third nonwoven fixed ends 145 oriented towards the longitudinal axis L to third nonwoven free ends 150. Along the central bonded portion 35, the second nonwoven 40 can be between the first nonwoven 15 and the third nonwoven 135. Optionally, along the central bonded portion 35, the intermediate nonwoven 95 can be between the second nonwoven 40 and the third nonwoven 135, if an intermediate nonwoven 95 is provided. Along the central bonded portion 35, the third nonwoven 135 can be below the second nonwoven 40 or optional intermediate nonwoven 95.

The central bonded portion 35 can extend through the third nonwoven 135 and the optional intermediate nonwoven 95. The central bonded portion 35 can extend through the second nonwoven 40 and the third nonwoven 135. The central bonded portion 35 can extend through the second nonwoven 40, the intermediate nonwoven 95, and the third nonwoven 135. The central bonded portion 35 can extend through the first nonwoven 15, the second nonwoven 40, the intermediate nonwoven 95, and the third nonwoven 135. The central bonded portion 35 can extend through the thickness of the second nonwoven 40 and the third nonwoven 135. The central bonded portion 35 can extend through the thickness of the second nonwoven 40, the intermediate nonwoven 95, and the third nonwoven 135. The central bonded portion 35 can extend through the thickness of the first nonwoven 15, the second nonwoven 40, the intermediate nonwoven 95, and the third nonwoven 135, the thickness being parallel to the z-axis Z. The central bonded portion 35 can be between the third nonwoven 135 and the optional intermediate nonwoven 95. The central bonded portion 35 or portion thereof can be between the second nonwoven 40 and the third nonwoven 135.

Each third nonwoven strip 140 can have a third nonwoven fixed end 145 oriented towards the central bonded portion 35 and extend to a third nonwoven free end 150. Some of the third nonwoven free ends 150 can be oriented towards the longitudinal edges 10. Optionally, more than about 30%, optionally more than about 50%, optionally more than about 70%, of the third nonwoven strips 140 can be bent so that the third nonwoven free ends 150 are out of plane relative to the third nonwoven fixed ends 145.

The third nonwoven fixed ends 145 can be outboard of the central bonded portion 35. Optionally, the third nonwoven fixed ends 145 can be spaced apart from the central bonded portion 35.

The third nonwoven 135 can be gate folded and comprise, or have gate folds 52 comprising, a third nonwoven main portion 155 that extends across the longitudinal axis L, a pair of third nonwoven fold lines 160 on opposite sides of the longitudinal axis, and a pair of third nonwoven gate portions 165 each of which extend from one of the third nonwoven fold lines 160 towards the central bonded portion 35 and are bonded to the third nonwoven main portion 155. The third nonwoven gate portions 165 can be bonded to the third nonwoven main portion 155 at positions, optionally spaced apart positions, on opposite sides of and away from the longitudinal axis L. The gate folds 52 in the third nonwoven 135 can provide for third nonwoven strips 140 that are flattened, open, deformed, or irregular loops. Optionally, the third nonwoven gate portions 165 can be bonded to the third nonwoven main portion 155 outboard of the central bonded portion 35 relative to the longitudinal axis L.

The third nonwoven main portion 155 can be between the third nonwoven gate portions 165 and the second nonwoven 40. The third nonwoven main portion 155 can be between the third nonwoven gate portion 165 and the optional intermediate nonwoven 95.

Without being bound by theory, providing the third nonwoven gate portions 165 folded away from the second nonwoven 40 and or optional intermediate nonwoven 95 might reduce the amount of positional control of the various nonwovens needed during manufacture to assemble the cleaning wipe 1. Optionally, the third nonwoven gate portions 165 can be between the third nonwoven main portion 155 and the second nonwoven main portion 75 or optional intermediate nonwoven main portion 115.

Open or openable loops can be provided as the third nonwoven strips 140 by providing that a portion of the third nonwoven gate portion 165 adjacent the third nonwoven fold line 160 and the third nonwoven main portion 155 are unbonded to one another. Such a structure can be an openable or open loop.

The third nonwoven gate portions 165 can extend from the third nonwoven fold line 160 to a third nonwoven gate portion end 170. The third nonwoven gate portion ends 170 can be bonded to the third nonwoven main portion 155.

The second nonwoven strips 45 and or intermediate nonwoven strips 100 and the third nonwoven strips 140 can have the same shape or can partially have the same shape as one another. Optionally, the first nonwoven strips 20 and second nonwoven strips 45, intermediate nonwoven strips 100, and third nonwoven strips 140 can have the same shape or partially the same shape as one another. Optionally, one or more of the first nonwoven strips 20, the second nonwoven strips 45, the optional intermediate nonwoven strips 100, and the optional third nonwoven strips 140 can be straight, curved, or a combination thereof.

The third nonwoven strips 140 can extend or be extendable further away from the longitudinal axis L than the second nonwoven strips 45. Optionally, the third nonwoven strips 140 can extend or be extendable further away from the longitudinal axis L than the first nonwoven strips 20 and or the intermediate nonwoven strips 100.

The cleaning wipe 1 can further comprise a fourth nonwoven 175 joined directly or indirectly to the third nonwoven 135 along the central bonded portion 35. The fourth nonwoven 175 can comprise a plurality of fourth nonwoven strips 180 extending from fourth nonwoven fixed ends 185 oriented towards the longitudinal axis L to fourth nonwoven free ends 192. Along the central bonded portion 35, the third nonwoven 135 can be between the second nonwoven 40 and the fourth nonwoven 175. Optionally, along the central bonded portion 35, the third nonwoven 135 can be between the intermediate nonwoven 95 and the fourth nonwoven 175, if an intermediate nonwoven 95 is provided. Along the central bonded portion 35, the fourth nonwoven 175 can be below the third nonwoven 135 or optional intermediate nonwoven 95.

The central bonded portion 35 can extend through the fourth nonwoven 175 and the third nonwoven 135. The central bonded portion 35 can extend through the third nonwoven 135 and the fourth nonwoven 175. The central bonded portion can extend through the first nonwoven 15, the second nonwoven 40, optionally through the optional intermediate nonwoven 95, the third nonwoven 135, and the fourth nonwoven 175. The central bonded portion can extend through the thickness of the first nonwoven 15, the second nonwoven 40, optionally the optional intermediate nonwoven 95, the third nonwoven 135, and the fourth nonwoven 175, the thickness being parallel to the z-axis Z. The central bonded portion 35 or a portion thereof can be between the fourth nonwoven 175 and the third nonwoven 135.

Each fourth nonwoven strip 180 can have a fourth nonwoven fixed end 185 oriented towards the central bonded portion 35 and extend to a fourth nonwoven free end 192. Some of the fourth nonwoven free ends 192 can be oriented towards the longitudinal edges 10. Optionally, more than about 30%, optionally more than about 50%, optionally more than about 70%, of the fourth nonwoven strips 180 can be bent so that the fourth nonwoven free ends 192 are out of plane relative to the fourth nonwoven fixed ends 185. The fourth nonwoven 175 can be gate folded and comprise, or have gate folds 52 comprising, a fourth nonwoven main portion 190 that extends across the longitudinal axis L, a pair of fourth nonwoven fold lines 195 on opposite sides of the longitudinal axis L, and a pair of fourth nonwoven gate portions 200 each of which extend from one of the fourth nonwoven fold lines 195 towards the central bonded portion 35 and are bonded to the fourth nonwoven main portion 190. The fourth nonwoven gate portions 200 can be bonded to the fourth nonwoven main portion 190 at positions, optionally spaced apart positions, on opposite sides of and away from the longitudinal axis L. The gate folds 52 in the fourth nonwoven 175 can provide for fourth nonwoven strips 180 that are flattened, open, deformed, or irregular loops. Optionally, the fourth nonwoven gate portions 200 can be bonded to the fourth nonwoven main portion 190 outboard of the central bonded portion 35 relative to the longitudinal axis L. Optionally, the fourth nonwoven 175 can be bonded to the third nonwoven 135 out board of the central bonded portion 35 by a pair of outboard bonds 37. The outboard bonds 37 can be longitudinally outboard of the central bonded portion 35. The outboard bonds 37 can be laterally separated from the central bonded portion 35. The outboard bonds 37 can extend between the transverse edges 5, on opposite sides of the longitudinal axis L, and be nearer to the longitudinal edges 10 than the central bonded portion 35. The outboard bonds 37 can be spaced apart from one another by from about 20 mm to about 80 mm, optionally from about 30 mm to about 60 mm, optionally from about 40 mm to about 50 mm. Each of the outboard bonds 37 can be equidistant from the longitudinal axis L. The outboard bonds 37 can be outboard of the optional absorbent core 225. The outboard bonds 37 can be a continuous or intermittent thermal bond and or chemical bond and or pattern of thermal or chemical bonds extending in a direction on or along or optionally generally parallel to the longitudinal axis L.

The fourth nonwoven main portion 190 can be between the fourth nonwoven gate portions 200 and the third nonwoven 135.

Providing the fourth nonwoven gate portions 200 folded away from the third nonwoven 135 can reduce the amount of positional control of the various nonwovens needed during manufacture to assemble the cleaning wipe 1. Optionally, the fourth nonwoven gate portions 200 can be between the fourth nonwoven main portion 190 and the third nonwoven 135.

Open or openable loops can be provided as the fourth nonwoven strips 180 by providing that a portion of the fourth nonwoven gate portion 200 adjacent the fourth nonwoven fold line 195 and the fourth nonwoven main portion 190 are unbonded to one another. Such a structure can be an openable or open loop.

The fourth nonwoven gate portions 200 can extend from the fourth nonwoven fold line 195 to a fourth nonwoven gate portion end 205. The fourth nonwoven gate portion ends 205 can be bonded to the fourth nonwoven main portion 190.

The first nonwoven strips 20 and or the second nonwoven strips 45 and or intermediate nonwoven strips 100 and or third nonwoven strips 140 and or fourth nonwoven strips 180 can have the same shape or can partially have the same shape as one another. Optionally, one or more of the first nonwoven strips 20, the second nonwoven strips 45, the optional intermediate nonwoven strips 100, the optional third nonwoven strips 140, and the optional fourth nonwoven strips 180 can be straight, curved, or a combination thereof.

The fourth nonwoven strips 180 can extend or be extendable further away from the longitudinal axis L than the third nonwoven strips 140. Optionally, the fourth nonwoven strips 180 can extend or be extendable further away from the longitudinal axis L than the first nonwoven strips 20 and or the second nonwoven strips 45 and or the intermediate nonwoven strips 100 and or the third nonwoven strips 140.

The third nonwoven fixed ends 145 can be registered with the fourth nonwoven fixed ends 185.

The first nonwoven strips 20 can have a first nonwoven strip length orthogonal to the longitudinal centerline L and a first nonwoven strip width parallel to the longitudinal axis L. The first nonwoven strip length can be at least two times, optionally three times, optionally four times, greater than the first nonwoven strip width. Likewise, second nonwoven strips 45 can have a second nonwoven strip length orthogonal to the longitudinal centerline L and a second nonwoven strip width parallel to the longitudinal axis L. The second nonwoven strip length can be at least two times, optionally three times, optionally four times, greater than the second nonwoven strip width. Likewise, intermediate nonwoven strips 100 can have an intermediate nonwoven strip length orthogonal to the longitudinal centerline L and an intermediate nonwoven strip width parallel to the longitudinal axis L. The intermediate nonwoven strip length can be at least two times, optionally three times, optionally four times, greater than the intermediate nonwoven strip width. Likewise, third nonwoven strips 140 can have a third nonwoven strip length orthogonal to the longitudinal centerline L and a third nonwoven strip width parallel to the longitudinal axis L. The third nonwoven strip length can be at least two times, optionally three times, optionally four times, greater than the third nonwoven strip width. Likewise, fourth nonwoven strips 180 can have a fourth nonwoven strip length orthogonal to the longitudinal centerline L and a fourth nonwoven strip width parallel to the longitudinal axis L. The fourth nonwoven strip length can be at least two times, optionally three times, optionally four times, greater than the fourth nonwoven strip width.

The first nonwoven strip length, second nonwoven strip length, and intermediate nonwoven strip length can be from about 10 mm to about 100 mm, optionally from about 20 mm to about 70 mm, optionally from about 30 mm to about 60 mm. The first nonwoven strip width, second nonwoven strip width, and intermediate nonwoven strip width can be from about 2 mm to about 30 mm, optionally from about 4 mm to about 20 mm, optionally from about 5 mm to about 15 mm.

The nonwovens described herein can be spun bonded, carded, hydroentangled spun bonded, wet laid, or air laid nonwovens. The nonwovens can be microfiber nonwovens. The fibers constituting the nonwovens can be selected from the group of cellulose, polypropylene, polyethylene, polyester, and combinations thereof. The fibers constituting the nonwovens can be natural fibers or synthetic fibers. The nonwovens can be hydrophilic nonwovens so that liquid can be acquired from the floor being cleaned. One or more of the nonwovens can comprise bicomponent fibers having a sheath of polyethylene and a core of polyester. The nonwovens described herein can be bicomponent thermoplastic synthetic fibers of an outer sheath of polyester and polyethylene core. The basis weight of each nonwoven can be from about 5 to about 500 g/m$^2$, optionally from about 10 to about 120 g/m$^2$, from about 15 to about 70 g/m$^2$, from about 20 to about 50 g/m$^2$. The nonwovens described herein can be mixture of hydrophilic and hydrophobic fibers, for example a mixture of cellulose fibers and polyethylene or polypropylene fibers. The nonwovens described herein, including those that include hydrophilic fibers as a fraction of the fiber makeup, can be homogeneously mixed and be made by carded thermal bonding, thru-air bonding, spun lacing, or wet laid. The nonwovens described herein can be laminates of synthetic fibers and natural fibers, for example a cellulosic tissue sandwiched between layers of synthetic fibers. The fibers of the nonwovens described herein may be coated with wax or oil to increase the ability of such coated fibers to retain solids gathered by the fibers. The nonwovens described herein can comprise microfibers.

Suitable nonwovens for one or more of the first nonwoven 15, second nonwoven 40, intermediate nonwoven 95, third nonwoven 135, and fourth nonwoven 175 can include a nonwoven material having a basis weight from about 20 g/m$^2$ to about 150 g/m$^2$, optionally from about 20 g/m$^2$ to about 70 g/m$^2$. The nonwoven materials can comprise a combination of pulp/tissue and spunbond polypropylene hydroentangled to the pulp in a wet laid process. Optionally, one or more of the nonwovens can comprise from about 10 g/m$^2$ to about 40 g/m$^2$ pulp/tissue and from about 10 g/m$^2$ to about 30 g/m$^2$ spunbond polypropylene hydroentangled to the pulp. The thickness of each of the nonwoven materials can be from about 300 to about 600 microns. Optionally, one or more of the nonwovens can comprise about 23 g/m$^2$ of pulp/tissue and about 17 g/m$^2$ spunbond polypropylene hydroentangled to the pulp in a wet laid process. Suitable nonwovens include 30 g/m$^2$ to 70 g/m$^2$, optionally 40 g/m$^2$, GENESIS nonwoven available from Suominen, Helsinki, Finland.

The nonwoven materials can comprise a bicomponent fiber comprising 1.7 DTEX round polyester staple fiber sheath and 2.2 DTEX round spunbond polypropylene fiber core. The nonwoven materials can have a thickness from about 0.5 mm to about 4 mm, optionally from about 1 mm to about 2 mm. Optionally the nonwoven materials can comprise 50 wt % or more polyethyleneterephthalate.

To help with manufacturability, it can be practical that the constituent fibers of the first nonwoven 15 and second nonwoven 40 differ from one another, i.e. differ from one another in fiber makeup. The difference in the fibrous makeup of the first nonwoven 15 and the second nonwoven 40 can help reduce the propensity for the first nonwoven strips 20 to unintentionally become bonded to the second nonwoven strips 45 when the strips are cut. The first nonwoven 15 can comprise more than about 40 wt %, optionally more than about 50 wt %, pulp. Optionally the second nonwoven can comprise more than about 40 wt %, optionally more than about 50 wt %, polyethyleneterephthalate. Optionally, the first nonwoven 15 can comprise more than about 40 wt % pulp and the second nonwoven 40 can differ from the first nonwoven 15. Optionally, the first nonwoven 15 and the intermediate nonwoven 95 can be the same as one another. Optionally, the second nonwoven 40 and the third nonwoven 135 can be the same as one another. Optionally, the second nonwoven 40 can differ from one or more of the first nonwoven 15, intermediate nonwoven 95, and third nonwoven 135. Optionally, the first nonwoven comprises first nonwoven constituent fibers and the second nonwoven comprises second nonwoven constituent fibers and the first nonwoven constituent fibers differ chemically from the second nonwoven constituent fibers.

Optionally, one or more of the first nonwoven 15, second nonwoven 40, intermediate nonwoven 95, third nonwoven 135, and fourth nonwoven 175, can be an about 20 g/m$^2$ to about 70 g/m$^2$ microfiber nonwoven, optionally about 60 wt % to about 80 wt % polyethyleneterephthalate and 20 wt % to about 40 wt % nylon 6. Optionally, the microfiber can be a microfiber comprising about 70 wt % polyethyleneterephthalate and about 30 wt % nylon 6.

The cleaning wipe 1 can further comprise a backsheet 210 that forms at least part of a back surface 215 of the cleaning wipe 1 opposite the first nonwoven 15. The backsheet 210 can extend further away from the longitudinal axis L than the central bonded portion 35. The backsheet 210 can be a polymer film. The backsheet 210 can be a polypropylene film, polyethylene film, low density polyethylene film or the like. The backsheet 210 can be a hydroentangled spunbond nonwoven having a basis weight from about 20 g/m$^2$ to about 80 g/m$^2$, optionally about 30 g/m$^2$ to about 60 g/m$^2$, optionally about 45 g/m$^2$. The backsheet 210 can be a polymer film having a basis weight from about 5 g/m$^2$ to about 100 g/m$^2$. The backsheet 210 can be a nonwoven, optionally a spun bond nonwoven.

The backsheet 210 can be the constituent part of the cleaning wipe 1 that can be directly or indirectly attached to the head of the cleaning implement. The backsheet 210 can be fluid impervious. A fluid impervious backsheet 210 can prevent liquid acquired by the cleaning wipe 1 from wetting the head of the cleaning implement.

The backsheet 210 can be directly attached to the head of the cleaning implement by wrapping the longitudinal edges 10 of the backsheet 210 around the longitudinal edges of the head of the cleaning implement and stuffing portions overwrapping part into grippers that are part of the head of the cleaning implement. Optionally, backsheet 210 can be directly attached to the head of the cleaning implement by wrapping the longitudinal edges 10 of the backsheet 210 around the longitudinal edges of the head of the cleaning implement and pushing the backsheet 210 so that protrusions on the head of the cleaning implement puncture holes in backsheet 210 and the protrusions anchor the backsheet 210 to the head.

The backsheet 210 can be directly joined to the second nonwoven 40, the intermediate nonwoven 95, the third nonwoven 135, fourth nonwoven 175, or whichever constituent layer is presented towards the backsheet 210. The backsheet 210 can be chemically bonded to such constituent layer.

Optionally, the cleaning wipe 1 can comprise a pair of spaced apart attachment members 220 joined to the backsheet 210 on opposite sides of the longitudinal axis L and oriented away from the first nonwoven 15.

The attachment members 220 can comprise a loop material having a plurality of loops. The loops can be loops of constituent fibers or formed loops. The loop material can be a nonwoven material. The attachment members 220 can be engaged and disengaged with complementary hook material on the head of the cleaning implement. The attachment members 220 and the complementary hook material can be formed from VELCRO.

The cleaning wipe 1 can be used in combination with a cleaning liquid. In such applications, the cleaning wipe 1 can also function to acquire the spent cleaning liquid from the floor. To provide for spent cleaning liquid storage, the cleaning wipe 1 can comprise an absorbent core 225. The absorbent core 225 can be positioned between a fluid acquisition layer 230 and the backsheet 210. The fluid acquisition layer 230 can be between the absorbent core 225 and the first nonwoven 15. The fluid acquisition layer 230, absorbent core 225, and backsheet 210 can extend along the longitudinal axis L.

The fluid acquisition layer 230 can be free of impingement by the central bonded portion 35 and optional outboard bonds 37. The central bonded portion 35 can be absent in the fluid acquisition layer 230. This may preserve the permeability of the fluid acquisition layer 230. The fluid acquisition layer 230 can be directly joined to the second nonwoven 40, the intermediate nonwoven 95, the third nonwoven 135, fourth nonwoven 175, or whichever constituent layer is presented towards the fluid acquisition layer 230. The fluid acquisition layer 230 can be chemically bonded to such constituent layer.

The absorbent core 225 can be an air laid core. The absorbent core 225 can comprise cellulose fibers. Optionally, the absorbent core 225 can comprise absorbent gelling material. The absorbent core 225 can comprise multiple plies of materials including layers of foam, wet laid cellulose fibers, air laid cellulose fibers, tissue, polypropylene spun bond nonwoven, polyester fibers, bicomponent cellulose and synthetic fibers, and the like.

The absorbent core 225 can extend along the entire length of the cleaning wipe 1 along the longitudinal ais L. Optionally, the absorbent core 225 can extend along about 50% to about 100%, optionally about 50% to 95%, of the length of the cleaning wipe 1 along the longitudinal axis L. The absorbent core 225 can have a width orthogonal to the longitudinal axis L from about 20 mm to about 100 mm, optionally from about 40 mm to about 60 mm. The width of the absorbent core 225 can be smaller than the spacing between the attachment members 220. The absorbent core 225 can have a width from about 15 mm to about 80 mm, optionally from about 30 mm to about 60 mm, optionally from about 40 mm to about 50 mm.

The absorbent core 225 can be free of impingement by the central bonded portion 35 and optional outboard bonds 37. The central bonded portion 35 can be absent in the absorbent core 225. This may preserve the absorbent capacity of the absorbent core 225. The absorbent core 225 can be chemically bonded to the fluid acquisition layer 230. The absorbent core 225 can be chemically bonded to the backsheet 210.

The fluid acquisition layer 230 and the backsheet 210 can be joined to one another along their longitudinal edges 10 outboard of the longitudinal axis L. The fluid acquisition layer 230 and the backsheet 210 can be joined to one another by a thermal bond, chemical bond, or a crimp bond along their respective longitudinal edges 10.

A practical approach for assembling the cleaning wipe 1 can be to provide the first nonwoven 15 as a continuous web and the second nonwoven 40 as a continuous web, both moving in the machine direction. Optionally, material for forming a chemical bond between the first nonwoven 15 and second nonwoven 40 can be stacked on top of the second nonwoven 40 or on the bottom of the first nonwoven 15. The first nonwoven 15 can be placed on top of the second nonwoven 40 and then bonded together, for example by chemical bonding or thermal bonding. If an intermediate nonwoven 95, and or third nonwoven 135, and or fourth nonwoven 175, and or additional layers are provided as a continuous web, such as a backsheet 210 in absence of an absorbent core 225, these layers and optional material for forming a chemical bonds therebetween, can be stacked in the appropriate order, and then bonded together, for example by chemical bonding or thermal bonding. Optionally, the stack of nonwovens can be bonded to one another and that bonded stack can be bonded to the backsheet 210 if a fluid acquisition layer 230 and absorbent core 225 are not provided.

The fluid acquisition layer 230, absorbent core 225, and backsheet 210 can be assembled as a continuous web independent of the nonwoven layers and then subsequently joined to the wiping assembly of the first nonwoven 15 and second nonwoven 40 and optional one or more of the intermediate nonwoven 95, and optional third nonwoven 135, and optional fourth nonwoven 175, and any other additional optional nonwoven layers. The wiping assembly can be joined to the fluid acquisition layer 230 by a chemical bond or a thermal bond on or along the longitudinal axis L. Once the layers of the wiping assembly and backsheet 210 or optionally the wiping assembly and the fluid acquisition layer 230, absorbent core 225, and backsheet 210 are assembled and bonded to one another as desired, the assembled continuous web can be cut in the cross direction to form individual cleaning wipes 1.

The absorbent core 225 can comprise a bicomponent cellulose/synthetic air laid material. The absorbent core 225 can comprise an air laid that is about 85:15 cellulose: bicomponent fibrous material. The absorbent core 225 can be a mixture of cellulose fibers and synthetic fibers, with cellulose fibers constituting from about 5 wt % to about 100 wt % of the absorbent core 225. The absorbent core 225 can have a basis weight from about 60 $g/m^2$ to about 500 $g/m^2$, optionally from about 60 $g/m^2$ to about 200 $g/m^2$. The absorbent core 225 can be an air laid 85:15 cellulose: bicomponent fibers having a basis weight of about 135 $g/m^2$.

Figure 3:
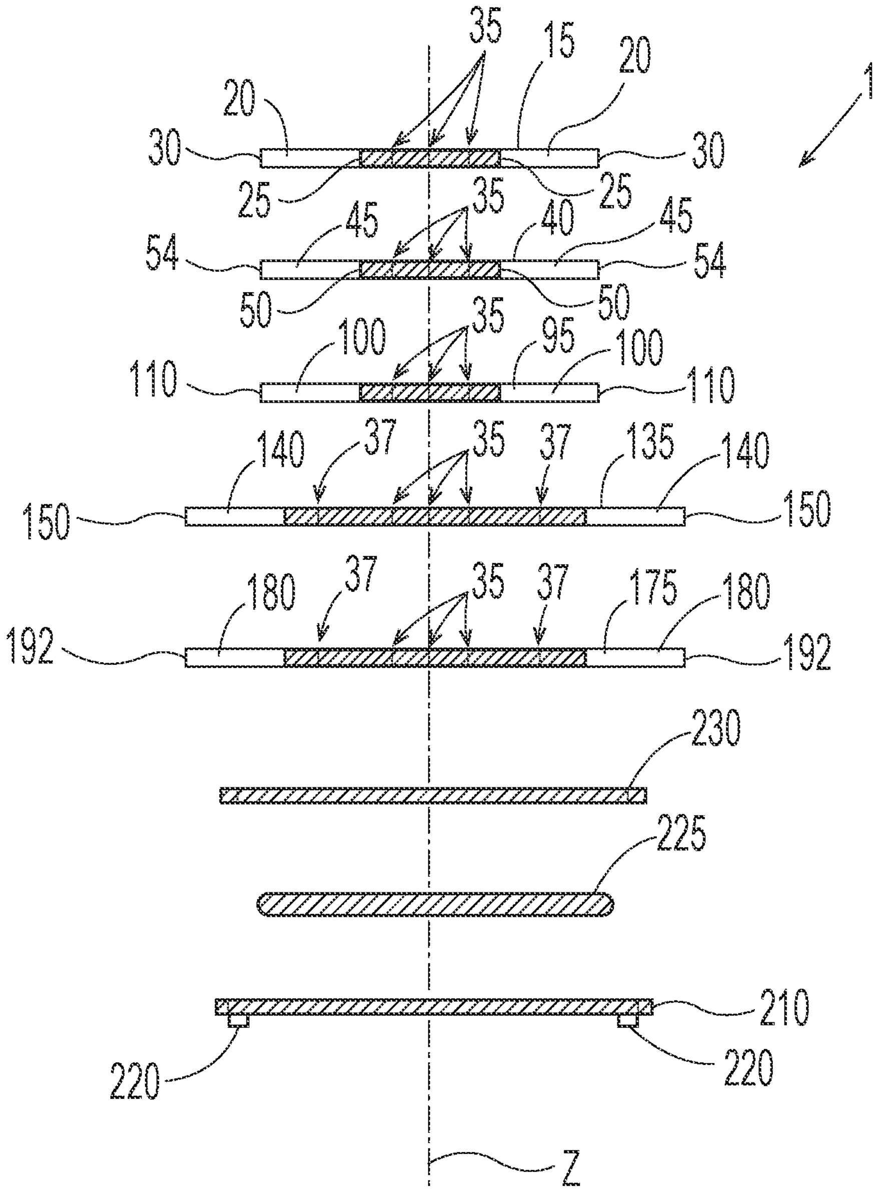
FIG. 3 is an exploded cross section view of a cleaning wipe having single layers of unfolded material.

With respect to the first nonwoven 15, second nonwoven 40, intermediate nonwoven 95, third nonwoven 135, and fourth nonwoven 175, one or more or all of these layers may be single unfolded layers of nonwoven material, by way of nonlimiting example as shown in FIG. 3. The strips of the respective layers can be defined by slits or cuts in the longitudinal edges 10 of each of the nonwoven layers.

Figure 4:
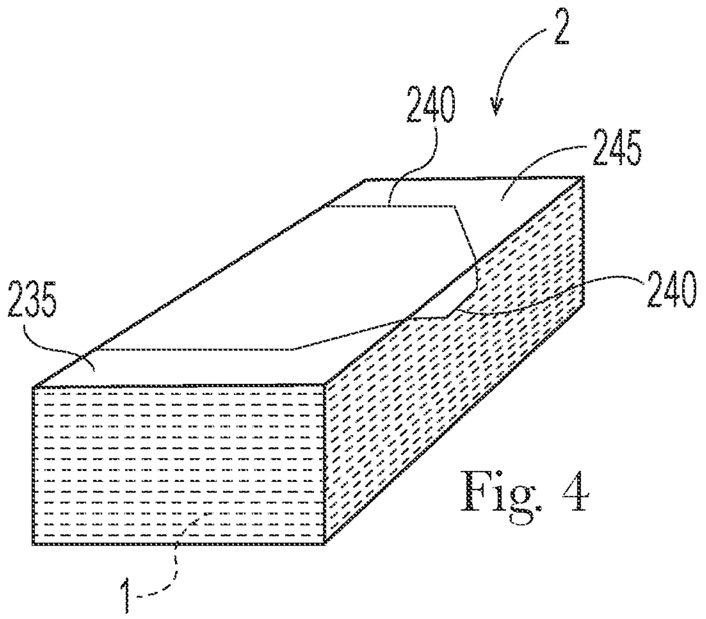
FIG. 4 is a previously unopened container containing cleaning wipes.

The cleaning wipe 1 can be provided to users as a product 2 comprising a closed container 235 and a plurality of cleaning wipes 1 contained in the container 235 (FIG. 4). The container 235 can contain more than one cleaning wipe 1. The container 235 can be a previously unopened container 235 filled with cleaning wipes 1. The container 235 can be one from which a cleaning wipe 1 has not been removed. The container 235 can be paperboard or corrugated cardboard carton or other pulp based container 235. The container 235 can be a bag comprising pulp, plastic bag, a plastic tub, or the like. The container 235 can comprise an intact frangible opening feature 240. The container 235 can be a hermetically sealed container 235, by way of nonlimiting example a polymeric bag or plastic tub. The frangible opening feature 240 can be a line of weakness defining or partially defining a portion of a container wall 245 that is to be torn to permit the container 235 to be opened for the first time. The frangible opening feature 240 can be part of an adhesive or shrink wrap applied to the container 235 to maintain the container 235 in a closed condition until the container 235 is first provided to the user.

The cleaning wipes 1 contained in the container 235 can be such that more than about 10%, optionally more than about 20%, optionally more than about 30%, optionally more than about 50%, optionally more than about 70%, by number of the second nonwoven strips 45 are bent so that the second nonwoven free ends 54 are out of plane relative to the second nonwoven fixed ends 50. Optionally, the cleaning wipes 1 contained in the container 235 can be such that more than about 10%, optionally more than about 20%, optionally more than about 30%, optionally more than about 50%, optionally more than about 70%, by number of the second nonwoven strips 45 are interlaced with the first nonwoven strips 20 so that portions of the second nonwoven strips 45 are above portions of the first nonwoven strips 20. Optionally, the cleaning wipes 1 contained in the container 235 can be such that more than about 10%, optionally more than about 20%, optionally more than about 30%, optionally more than about 50%, optionally more than about 70%, by number of the first nonwoven strips 20 are bent so that the first nonwoven free ends 30 are out of plane relative to the first nonwoven fixed ends 25 to provide for fluffiness to the cleaning wipe 1. Optionally, more than about 10%, optionally more than about 20%, optionally more than about 30%, optionally more than about 50%, optionally more than about 70%, by number of the intermediate nonwoven strips 100 can be bent and or interlaced with the second nonwoven strips 45 so that portions of the intermediate nonwoven strips 100 are above portions of the second nonwoven strips 45.

As such, the cleaning wipe 1 is adequately fluffed or bulked at the time of packing the cleaning wipe 1 into the container 235 and is ready for effective use immediately upon removal from the container 235. This can simplify use and improve performance of the cleaning wipe 1 because the user does not have to take any steps or action to fluff or bulk the cleaning wipe 1 prior to use, which might be a step or action that the user might forget, skip, or inadequately perform.

Figure 5:
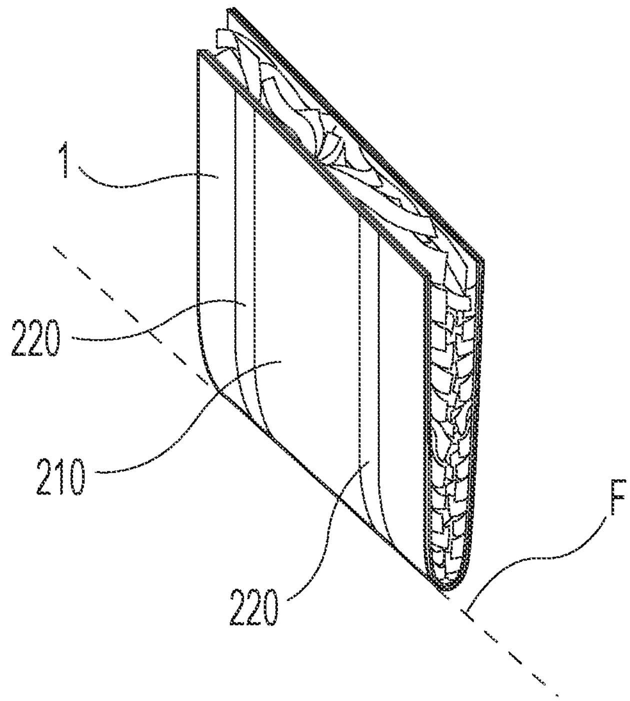
FIG. 5 is a folded cleaning wipe.

To provide for more compact distribution and storage of the cleaning wipes 1, each cleaning wipe 1 can be folded orthogonal to the longitudinal axis L (FIG. 5). Optionally, the cleaning wipe 1 is folded about a fold axis F orthogonal to the longitudinal axis L and portions of the first nonwoven 15 on opposite sides of the fold axis F can face one another. The cleaning wipe 1 can be bi-folded across the longitudinal axis L, optionally such that the bi-folds are located equidistant from the transverse edges 5.

Figure 6:
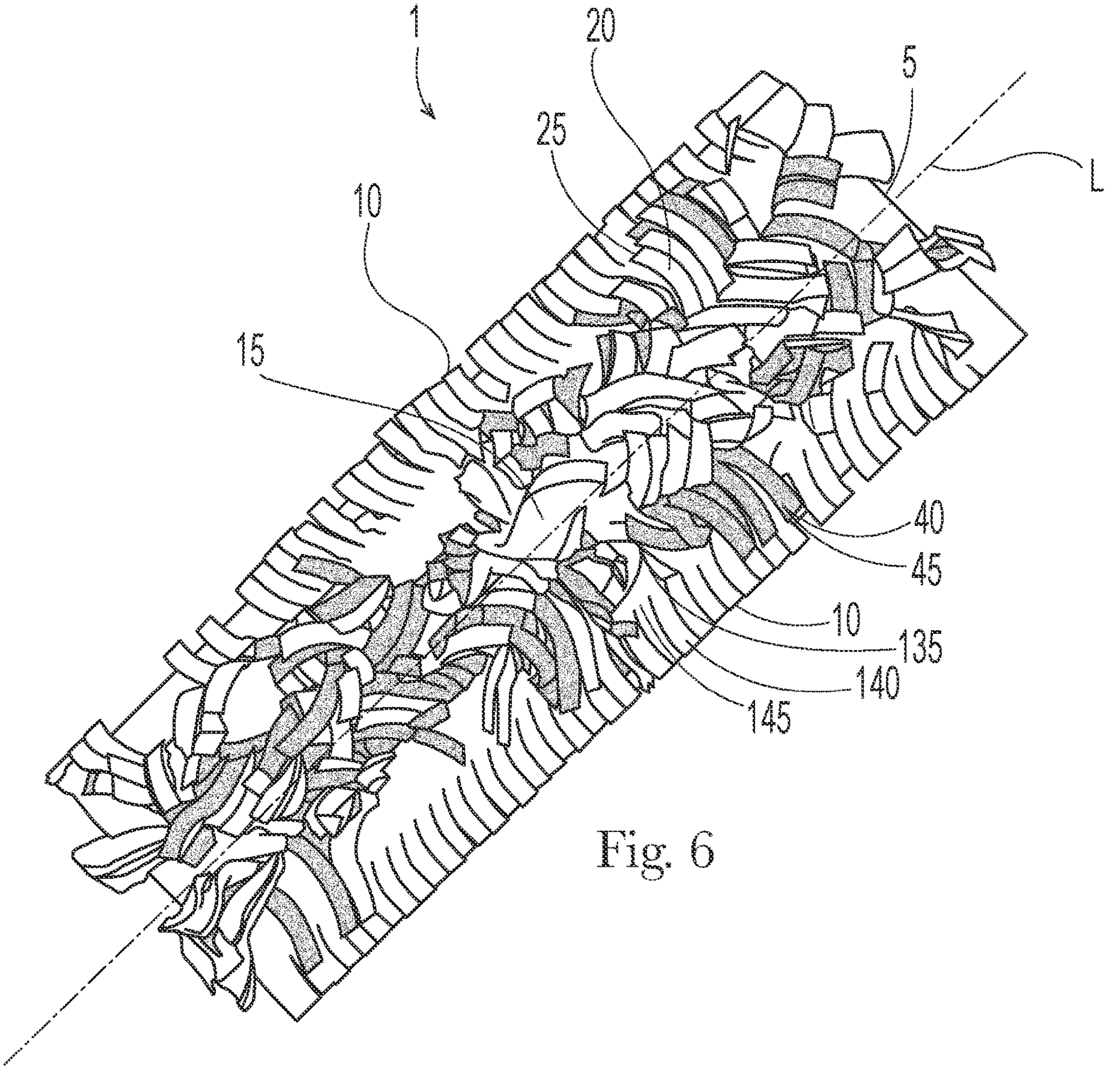
FIG. 6 is perspective view of a cleaning wipe in which the first nonwoven strips have a first color and the second nonwoven strips have a second color.

Optionally, the first nonwoven strips 20 can have a first color and the second nonwoven strips 45 can have a second color (FIG. 6). The first color can differ from the second color. The first color and the second color can be measured a Hunter Reflectance Meter test according to the colors L*, a*, and b*, the L*, a*, and b*, the difference in color being calculated using the L*, a*, and b* values by the formula $\Delta E=[(L^*_X-L^*_Y)\ 2+(a^*_X-a^*_Y)^2+(b^*_X-b^*_Y)^2]^{1/2}$, wherein X represents the first nonwoven strips 20 and Y represents the second nonwoven strips 45, wherein the ΔE between the first nonwoven strips 20 and the second nonwoven strips 45 is at least about 1.

Reflectance color is measured using the Hunter Lab LabScan XE reflectance spectrophotometer obtained from Hunter Associates Laboratory of Reston, Virginia, United States of America. The color of the first nonwoven strips 20 and second nonwoven strips 45 is tested at an ambient temperature between 18 C and 24 C and a relative humidity between 50% and 80%.

The spectrophotometer is set to the CIELab color scale and with a D65 illumination. The Observer is set at 10° and the Mode is set at 45/0°. Area View is set to 0.125" and Port Size is set to 0.20". The spectrophotometer is calibrated prior to sample analysis utilizing the black glass and white reference tiles supplied from the vendor with the instrument. Calibration is done according to the manufacturer's instructions as set forth in LabScan XE User's Manual, Manual Version 1.1, August 2001, A60-1010-862. If cleaning is required of the reference tiles or samples, only tissues that do not contain embossing, lotion, or brighteners should be used (e.g., PUFFS tissue). Any sample point on respective strip containing the color to be analyzed can be selected.

The respective strip is placed over the sample port of the spectrophotometer with a white clamp disk placed behind the respective strip.

The respective strip is removed and repositioned so that a minimum of six readings of color of the strip are conducted. If possible (e.g., the size of the imparted color on the respective strip in question does not limit the ability to have six discretely different, non-overlapping sample points), each of the readings is to be performed at a substantially different region on the respective strip so that no two sample points overlap. If the size of the respective strip requires overlapping of sample points, only six samples should be taken with the sample points selected to minimize overlap between any two sample points. The readings are averaged to yield the reported L*, a*, and b* values for a specified color on an externally visible surface of a respective strip.

The first color and the second color are considered to have different colors if ΔE is greater than about 1. Optionally, The first color and the second color can be considered to have different colors if ΔE is greater than about 10. Optionally, the first color and the second color can be considered to have different colors if ΔE is greater than about 30, optionally greater than about 50.

Optionally, the first nonwoven strips 20 can have a first color, the second nonwoven strips 45 can have a second color, and the intermediate nonwoven strips 100 can have a third color. The second color can differ from the first color and the second color can differ from the third color. Optionally, the second color can differ from at least one of the first color and the third color. The second color can be measured as described above. The third color can be measured as described above for the first nonwoven strips 20 with the measurements made on the third nonwoven strips 140 substituted in place of the measurements made on the first nonwoven strips 20. The intermediate nonwoven strips 100 can have a third color and the second nonwoven strips 45 have a second color. The third color and the second color are measured by a Hunter Reflectance Meter test according to the colors L*, a*, and b*. The third color and the second color can have a difference in color calculated using L*, a*, and b* values by the formula $\Delta E=[(L^*_Z-L^*_Y)\ 2+(a^*_Z+a^*_Y)\ ^2+(b^*_Z-b^{*Y})^2]^{1/2}$, wherein Z represents the intermediate nonwoven strips 100 and Y represents the second nonwoven strips 45. The ΔE between the intermediate nonwoven strips 100 and the second nonwoven strips 45 can be greater than 10. The second color and the third color can be considered to have different colors if ΔE is greater than about 10. Optionally, the second color and the third color can be considered to have different colors if ΔE is greater than about 10. Optionally, the second color and the third color can be considered to have different colors if ΔE is greater than about 30. Optionally, the second color and the third color can be considered to have different colors if ΔE is greater than about 50.

The difference in colors between the first nonwoven strips 20 and second nonwoven strips 45 and optionally between the second nonwoven strips 45 and the third nonwoven strips 140 can help the user identify that the cleaning wipe 1 is adequately fluffed or bulked. The different in color between the respective strips allows the user to see the interlacing or overlapping of the respective strips. If all of the respective strips have the same color, for example white, it can be difficult for the user to see that the strips are interlaced with one another and understand if the cleaning wipe 1 is sufficiently fluffed or fluffed to the desired degree.

The layers of nonwovens and parts of nonwovens described herein can be bonded to one another by thermal bonds. Optionally, the layers nonwovens and parts of nonwovens can be bonded to one another by chemical bonds. Chemical bonds include adhesives. The bonds can be continuous bonds, such as line bonds, or be intermittent bonds, in which the bonds are spaced apart from one another. For example, the central bonded portion 35 and optionally outboard bonds 37 can be continuous line bond extending continuously between the transverse edges 5. Optionally, the central bonded portion 35 and optional outboard bonds 37 can be an intermittent bond. An intermittent bond can be a plurality of discrete bonds that are spaced apart from one another in a regular or irregular pattern, the assembly of which extends or substantially extends between the transverse edges 5.

Figure 7:
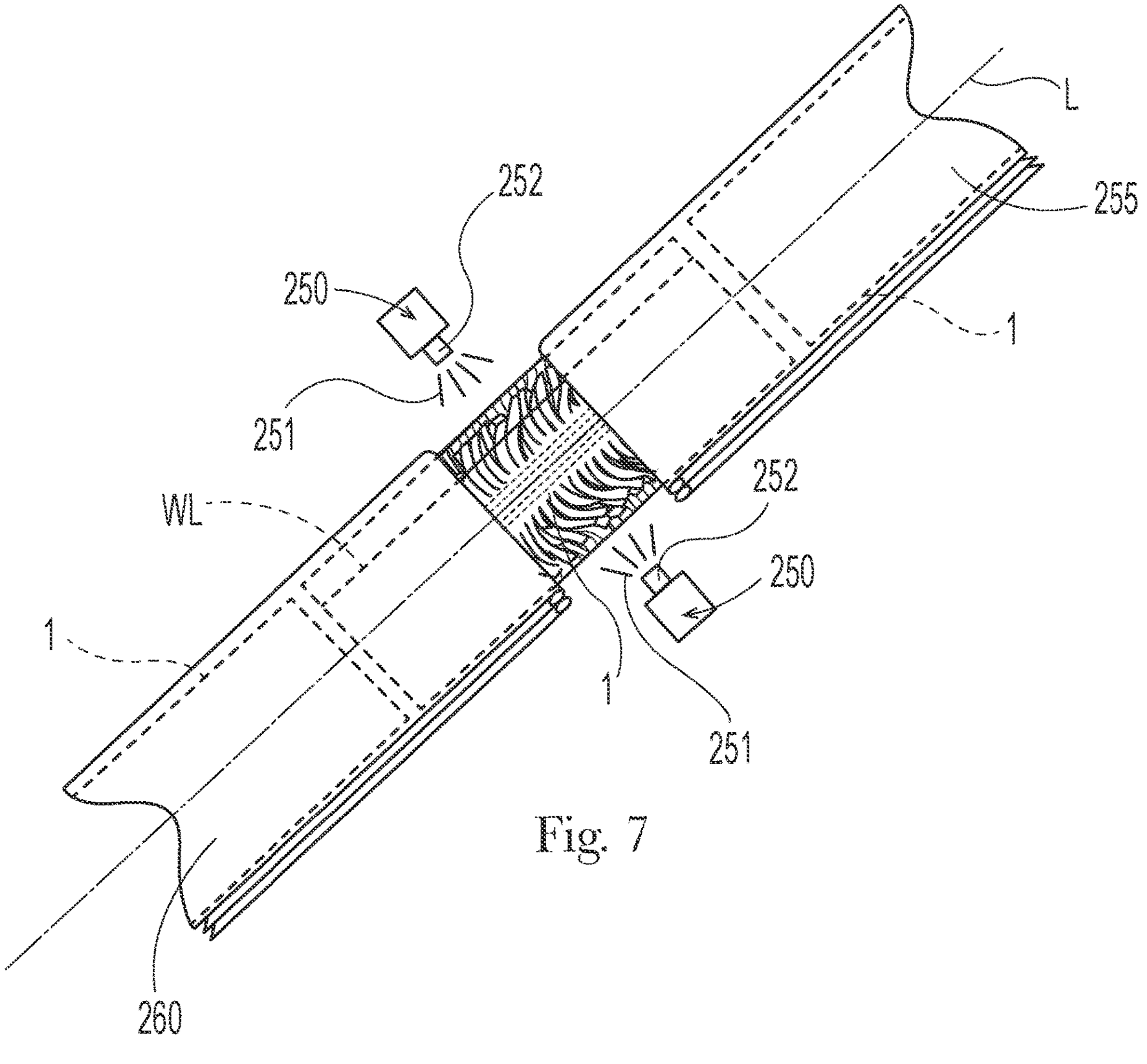
FIG. 7 is a portion of an apparatus for fluffing a cleaning wipe.

The cleaning wipe 1 can be packaged by a process that comprises providing a cleaning wipe 1 as described herein and illustrated by way of nonlimiting example in FIG. 7. The cleaning wipe 1 can initially be in the condition in which the strips of the various nonwovens are not interlaced with one another. The cleaning wipe 1 can be moved in a direction aligned with the longitudinal axis L. The strips of the various nonwovens can be bent or interlaced with one another manually or by moving a gas 251 towards each of the longitudinal edges 10 from positions 250 on opposite sides of the longitudinal axis L and beyond the longitudinal edges 10, thereby bending the second nonwoven strips 45 so that the second nonwoven free ends 54 are out of plane relative to the second nonwoven fixed ends 50 to fluff the cleaning wipe 1. The strips of the various nonwovens can be bent or interlaced with one another by moving a gas from positions 250 on opposite sides of the longitudinal axis L and beyond the longitudinal edges 10 towards the longitudinal axis L, thereby bending the second nonwoven strips 45 so that the second nonwoven free ends 54 are out of plane relative to the second nonwoven fixed ends 50 to fluff the cleaning wipe 1. Optionally, moving a gas 251 towards each longitudinal edges 10 from positions 250 on opposite sides of the longitudinal axis L and beyond the longitudinal edges 10 can interlace the first nonwoven strips 20 and the second nonwoven strips 45 to form a cleaning wipe 1 that is fluffed. The gas 251 can be moved by blowing the gas 251 from positions 250 or drawing the gas 251 towards the longitudinal axis L by vacuum duct located above the longitudinal axis L. The cleaning wipe 1 that is fluffed can be placed in a container 235 and the container 235 can be closed.

The positions 250 can comprise blowers 252 individually directed at opposite longitudinal edges 10. The blowers 252 can comprise a nozzle to direct flow of the gas 251.

The positions 250 can be in plane with the longitudinal axis L and transverse axis T of the cleaning wipe 1 outboard of the longitudinal edges 10. There can be two or more such positions. Optionally or additionally, positions 250 can be provided above the plane defined by the longitudinal axis L and transverse axis T of the cleaning wipe and outboard of the longitudinal edges 10. There can be two or more such elevated relative to and outboard of the longitudinal edges 10. Gas 251 can be directed at an angle relative to the plane of the cleaning wipe 1 defined by the longitudinal axis L and transverse axis T. In one practical arrangement, gas 251 can be moved across the longitudinal edges 10 in the plane defined by the longitudinal axis L and transverse axis T of the cleaning wipe 1. Optionally or additionally, gas 251 can be moved at an angle across the longitudinal edges 10 at an angle relative to the plane of the cleaning wipe 1 defined by the longitudinal axis L and the transverse axis T. That is, the gas 251 can be moved at an angle relative to the cleaning wipe 1 across the longitudinal edges 251. Such an arrangement can help lift the strips of various nonwovens out of plane of the cleaning wipe by way of the venturi effect.

The gas 251 can be provided at a pressure from about 1 bar to about 6 bars, optionally from about 2 bar to about 4 bars.

Optionally, the cleaning wipe 1 that is fluffed can be folded about a fold axis F orthogonal to the longitudinal axis L before placing the cleaning wipe 1 that is fluffed in the container 235. The cleaning wipe 1 that is fluffed can be folded such that portions of the first nonwoven 15 on opposite sides of the fold axis F can face one another. Such an arrangement can preserve and protect the fluffed structure in the interior of the fold since the various of nonwoven strips may interlock or intermesh to some degree which can help reduce the potential for the strips to fall back to be more in plane with the portion of the nonwoven from which the strips extend. Furthermore, it may be easier to compactly pack since the fluffed surfaces of adjacent packed cleaning wipes 1 are not in substantial contact with one another. In an arrangement in which the first nonwoven 15 on opposite sides of the fold axis F face away from one another, the various nonwoven strips may tend to fall back to be more in plane with portion of the nonwoven from which the strips extend.

Folding can be performed manually or by using a machine designed for such purpose. Optionally, cleaning wipe 1 can be folded such that portions of the first nonwoven 15 on opposite sides of the fold axis F are on the exterior of the fold, which may be an easier folding process to implement.

As part of the process of bending the various nonwoven strips or interlacing the various nonwoven strips, the cleaning wipe 1 can be moved from a first sandwich belt conveyor 255 to a second sandwich belt conveyor 260. The positions 250 can be downstream of the first sandwich belt conveyor 255 and upstream of the second sandwich belt conveyor 260. As the cleaning wipe 1 is being handed downstream from the first sandwich belt conveyor 255 to the second sandwich belt conveyor 260, the portion of the cleaning wipe 1 between the first sandwich belt conveyor 255 and the second sandwich belt conveyor 260 can be unrestrained in a directions orthogonal to the longitudinal axis L. By being unrestrained out of plane of cleaning wipe 1 the various layer of strips can be manipulated out of plane of the cleaning wipe 1. The gas

251 moved towards the longitudinal edges 10 can bend, and or lift, and or flutter the nonwoven strips of the nonwovens which can result in the nonwoven strips of different nonwovens being bent and or interlacing with one another. One or both of the first sandwich belt conveyor 255 and the second sandwich belt conveyor 260 can control the position of the cleaning wipe 1 and restrain the cleaning wipe 1 from movement in the cross direction orthogonal to the longitudinal axis L as the gas 251 is moved towards the longitudinal edges 10.

The cleaning wipe 1 can have a wipe length WL along the longitudinal axis L. The first sandwich belt conveyor 255 and the second sandwich belt conveyor 260 can together or individually can hold more than about 10%, optionally more than about 20%, optionally more than about 40%, optionally more than about 60%, optionally more than about 80%, of the length of the cleaning wipe 1 when moving gas toward each longitudinal edge 10.

Combinations

An example follows:

A. A cleaning wipe (1) having a longitudinal axis (L) extending between opposing transverse edges (5) that cross said longitudinal axis and longitudinal edges (10) spaced apart from said longitudinal axis and extending between said transverse edges, wherein said cleaning wipe comprises:

a first nonwoven (15) extending along said longitudinal axis and comprising a plurality of first nonwoven strips (20) extending from first nonwoven fixed ends (25), wherein said first nonwoven fixed ends are oriented towards said longitudinal axis;

a second nonwoven (40) extending along said longitudinal axis, wherein said second nonwoven is joined to said first nonwoven along a central bonded portion (35) and comprises a plurality of second nonwoven strips (45) extending from second nonwoven fixed ends (50) to second nonwoven free ends (54), wherein said second nonwoven fixed ends are oriented towards said longitudinal axis, wherein along said central bonded portion said second nonwoven is below said first nonwoven;

a third nonwoven (135) extending along said longitudinal axis, wherein said third nonwoven is joined directly or indirectly to said second nonwoven along said central bonded portion and comprises a plurality of third nonwoven strips (140) extending from third nonwoven fixed ends (145), wherein said third nonwoven fixed ends are oriented towards said longitudinal axis, and wherein along said central bonded portion said second nonwoven is between said first nonwoven and said third nonwoven; and a fourth nonwoven (175) extending along said longitudinal axis, wherein said fourth nonwoven is joined to said third nonwoven along said central bonded portion and comprises a plurality of fourth nonwoven strips (180) extending from fourth nonwoven fixed ends (185), wherein said fourth nonwoven fixed ends are oriented towards said longitudinal axis L, and wherein along said central bonded portion said third nonwoven is between said second nonwoven and said fourth nonwoven, wherein said fourth nonwoven is further joined to said third nonwoven by a pair of outboard bonds (37) that are outboard of said central bonded portion on opposite sides of said longitudinal axis, wherein said outboard bonds extend between said transverse edges;

wherein more than about 10% by number of said second nonwoven strips are bent so that said second nonwoven free ends are out of plane relative to said second nonwoven fixed ends.

B. The cleaning wipe according to Paragraph A, wherein said central bonded portion comprises thermal bonds.

C. The cleaning wipe according to Paragraph A or B, wherein said central bonded portion comprises chemical bonds.

D. The cleaning wipe according to any of Paragraphs A to C, wherein said first fixed ends are registered with said second fixed ends.

E. The cleaning wipe according to any of Paragraphs A to D, wherein said first nonwoven strips are longer than said second nonwoven strips.

F. The cleaning wipe according to any of Paragraphs A to E, wherein more than 30% by number of said second nonwoven strips are bent so that said second nonwoven free ends are out of plane relative to said second nonwoven fixed end.

G. The cleaning wipe according to any of Paragraphs A to F, wherein said first nonwoven is gate folded and comprises a first nonwoven main portion (55) that extends across said longitudinal axis, a pair of first nonwoven fold lines (60) on opposite sides of said longitudinal axis, and a pair of first nonwoven gate portions (65) each of which extend from one of said first nonwoven fold lines towards said central bonded portion and are bonded to said first nonwoven main portion.

H. The cleaning wipe according to Paragraph G, wherein said first nonwoven gate portions are between said first nonwoven main portion and said second nonwoven.

I. The cleaning wipe according to Paragraph G or H, wherein parts of said first nonwoven gate portions adjacent said first nonwoven fold lines and said first nonwoven main portion are unbonded to one another.

J. The cleaning wipe according to any of Paragraphs A to I, wherein said second nonwoven is gate folded and comprises a second nonwoven main portion (75) that extends across said longitudinal axis, a pair of second nonwoven fold lines (80) on opposite sides of said longitudinal axis, and a pair of second nonwoven gate portions (85), each of which extend from one of said second nonwoven fold lines towards said central bonded portion and are bonded to said second nonwoven main portion.

K. The cleaning wipe according to Paragraph J, wherein said second nonwoven main portion is between said second nonwoven gate portions and said first nonwoven.

L. The cleaning wipe according to Paragraph J or K, wherein said second nonwoven gate portions each extend to an individual second nonwoven gate portion end (90), wherein parts of said second nonwoven gate portions adjacent said second nonwoven fold lines and said second nonwoven main portion are unbonded to one another.

M. The cleaning wipe according to any of Paragraphs A to L, wherein said cleaning wipe further comprises:

an intermediate nonwoven (95) extending along said longitudinal axis, wherein said intermediate nonwoven is joined to said second nonwoven along said central bonded portion and comprises a plurality of intermediate nonwoven strips (100) extending from intermediate nonwoven fixed ends (105), wherein said intermediate nonwoven fixed ends are oriented towards said longitudinal axis, and wherein along said central bonded portion said second nonwoven is between said first nonwoven and said intermediate nonwoven.

N. The cleaning wipe according to Paragraph M, wherein said intermediate nonwoven fixed ends are registered with said first nonwoven fixed ends and said second nonwoven fixed ends.

O. The cleaning wipe according to Paragraph M or N, wherein said intermediate nonwoven is gate folded and comprises an intermediate nonwoven main portion (115) that extends across said longitudinal axis, a pair of intermediate nonwoven fold lines (120) on opposite sides of said longitudinal axis, and a pair of intermediate nonwoven gate portions (125), each of which extend from one of said intermediate nonwoven fold lines towards said central bonded portion and are bonded to said intermediate nonwoven main portion.

P. The cleaning wipe according to Paragraph O, wherein said intermediate nonwoven main portion is between said intermediate nonwoven gate portion and said second nonwoven.

Q. The cleaning wipe according to Paragraph O or P, wherein said intermediate nonwoven gate portions each extend to an individual intermediate nonwoven gate portion end (130), wherein parts of said intermediate nonwoven gate portions adjacent said intermediate nonwoven fold line and said intermediate nonwoven main portion are unbonded to one another.

R. The cleaning wipe according to any of Paragraphs A to Q, wherein said third nonwoven strips extend further away from said longitudinal axis than said second nonwoven strips.

S. The cleaning wipe according to any of Paragraphs A to R, wherein said third nonwoven is gate folded and comprises a third nonwoven main portion (155) that extends across said longitudinal axis, a pair of third nonwoven fold lines (160) on opposite sides of said longitudinal axis, and a pair of third nonwoven gate portions (165) each of which extend from one of said third nonwoven fold lines towards said central bonded portion and are bonded to said third nonwoven main portion.

T. The cleaning wipe according to Paragraph S, wherein said third nonwoven gate portions are bonded to said third nonwoven main portion at positions, optionally spaced apart positions, on opposite sides of and away from said longitudinal axis.

U. The cleaning wipe according to Paragraph S or T, wherein said third nonwoven main portion is between said third nonwoven gate portion and said second nonwoven.

V. The cleaning wipe according to any of Paragraphs S to U, wherein said third nonwoven gate portions each extend to an individual third nonwoven gate portion end (170), wherein parts of said third nonwoven gate portions adjacent said third nonwoven fold lines and said third nonwoven main portion are unbonded to one another.

W. The cleaning wipe according to any of Paragraphs A to V, wherein said fourth nonwoven strips extend further away from said longitudinal axis than said second nonwoven strips.

X. The cleaning wipe according to any of Paragraphs A to W, wherein said fourth nonwoven is gate folded and comprises a fourth nonwoven main portion (190) that extends across said longitudinal axis, a pair of fourth nonwoven fold lines (195) on opposite sides of said longitudinal axis, and a pair of fourth nonwoven gate portions (200) each of which extend from one of said fourth nonwoven fold lines towards said central bonded portion and are bonded to said fourth nonwoven main portion.

Y. The cleaning wipe according to Paragraph X, wherein said fourth nonwoven gate portions are bonded to said fourth nonwoven main portion at positions, optionally spaced apart positions on opposite sides of and away from said longitudinal axis.

Z. The cleaning wipe according to Paragraph X or Y, wherein said fourth nonwoven main portion is between said fourth nonwoven gate portion and said third nonwoven.

AA. The cleaning wipe according to any of Paragraphs X to Z, wherein said fourth nonwoven gate portions each extend to an individual fourth nonwoven gate portion end (205), wherein parts of said fourth nonwoven gate portions adjacent said fourth nonwoven fold lines and said fourth nonwoven main portion are unbonded to one another.

BB. The cleaning wipe according to any of Paragraphs A to AA, wherein said cleaning wipe further comprises a backsheet (210) forming at least part of a back surface (215) of said cleaning wipe opposite said first nonwoven, wherein said backsheet extends further away from said longitudinal axis than said central bonded portion.

CC. The cleaning wipe according to Paragraph BB, wherein said cleaning wipe further comprises a pair of spaced apart attachment members (220) joined to said backsheet on opposite sides of said longitudinal axis and oriented away from said first nonwoven.

DD. The cleaning wipe according to Paragraph BB or CC, wherein said cleaning wipe further comprises an absorbent core (225) positioned between a fluid acquisition layer (230) and said backsheet, wherein said fluid acquisition layer is between said absorbent core and said first nonwoven and wherein each of said fluid acquisition layer, said absorbent core, and said backsheet extend along at least part of said longitudinal axis.

EE. The cleaning wipe according to Paragraph DD, wherein said absorbent core is an air laid core.

FF. The cleaning wipe according to any of Paragraphs A to EE, wherein said first nonwoven strips have a first color and said second nonwoven strips have a second color, wherein said first color differs from said second color.

GG. The cleaning wipe according to any of Paragraphs M to Q, wherein said first nonwoven strips have a first color, said second nonwoven strips have a second color, and said intermediate nonwoven strips have a third color, wherein said second color differs from said first color and said second color differs from said third color.

HH. The product according to any of Paragraphs M to Q, wherein said first nonwoven strips have a first color, said second nonwoven strips have a second color, and said intermediate nonwoven strips have a third color, wherein said second color differs from at least one of said first color and said third color.

II. The cleaning wipe according to any of Paragraphs A to HH, wherein said first nonwoven strips have a first color and said second nonwoven strips have a second color, wherein said first color and said second color are measured by a Hunter Reflectance Meter test according to the colors L*, a*, and b*, wherein said first color and said second color have a difference in color calculated using L*, a*, and b* values by the formula $\Delta E=[(L^*_X-$ $*L_Y)^2+(a*_X-a*_Y)^2+(b*_X-b*_Y)^2]^{1/2}$, wherein X represents said first nonwoven strips and Y represents said second nonwoven strips, wherein the ΔE between the first nonwoven strips and the second nonwoven strips is greater than 10.

JJ. The cleaning wipe according to any of Paragraph M to Q, wherein said intermediate nonwoven strips have an third color and said second nonwoven strips have a second color, wherein said third color and said second color are measured by a Hunter Reflectance Meter test according to the colors L*, a*, and b*, wherein said third color and said second color have a difference in color calculated using L*, a*, and b* values by the formula $\Delta E=[(L*_z-L*_Y)^2+(a*_z-a*_Y)^2+(b*_z-b*_Y)^2]^{1/2}$, wherein Z represents said intermediate nonwoven strips and Y represents said second nonwoven strips, wherein the ΔE between the intermediate nonwoven strips and the second nonwoven strips is greater than 10.

KK. The cleaning wipe according to any of Paragraphs A to JJ, wherein said central bonded portion is a continuous bond or intermittent bond.

LL. The cleaning wipe according to any of Paragraphs A to KK, wherein said outboard bonds are a continuous bond or intermittent bond.

MM. The cleaning wipe according to any of Paragraphs A to LL, wherein said first nonwoven strips extend from said first nonwoven fixed ends to first nonwoven free ends (30), wherein more than about 10% by number of said first nonwoven strips are bent so that said first nonwoven free ends are out of plane relative to said first nonwoven fixed ends.

NN. The cleaning wipe according to any of Paragraphs A to MM, wherein said first nonwoven comprises more than about 40 wt % pulp and said second nonwoven differs from said first nonwoven.

OO. The cleaning wipe according to any of Paragraphs A to NN, wherein said first nonwoven comprises first nonwoven constituent fibers and said second nonwoven comprises second nonwoven constituent fibers, wherein said first nonwoven constituent fibers differ chemically from said second nonwoven constituent fibers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning wipe having a longitudinal axis extending between opposing transverse edges that cross said longitudinal axis and longitudinal edges spaced apart from said longitudinal axis and extending between said transverse edges, wherein said cleaning wipe comprises:

a first nonwoven extending along said longitudinal axis and comprising a plurality of first nonwoven strips extending from first nonwoven fixed ends, wherein said first nonwoven fixed ends are oriented towards said longitudinal axis;

a second nonwoven extending along said longitudinal axis, wherein said second nonwoven is joined to said first nonwoven along a central bonded portion and comprises a plurality of second nonwoven strips extending from second nonwoven fixed ends to second nonwoven free ends, wherein said second nonwoven fixed ends are oriented towards said longitudinal axis, wherein along said central bonded portion said second nonwoven is below said first nonwoven;

a third nonwoven extending along said longitudinal axis, wherein said third nonwoven is joined directly or indirectly to said second nonwoven along said central bonded portion and comprises a plurality of third nonwoven strips extending from third nonwoven fixed ends, wherein said third nonwoven fixed ends are oriented towards said longitudinal axis, and wherein along said central bonded portion said second nonwoven is between said first nonwoven and said third nonwoven; and a fourth nonwoven extending along said longitudinal axis, wherein said fourth nonwoven is joined to said third nonwoven along said central bonded portion and comprises a plurality of fourth nonwoven strips extending from fourth nonwoven fixed ends, wherein said fourth nonwoven fixed ends are oriented towards said longitudinal axis L, and wherein along said central bonded portion said third nonwoven is between said second nonwoven and said fourth nonwoven, wherein said fourth nonwoven is further joined to said third nonwoven by a pair of outboard bonds that are outboard of said central bonded portion on opposite sides of said longitudinal axis, wherein said outboard bonds extend between said transverse edges;

wherein more than about 10% by number of said second nonwoven strips are bent so that said second nonwoven free ends are out of plane relative to said second nonwoven fixed ends and are above said first nonwoven free ends such that said first nonwoven free ends are between said second nonwoven free ends and said third nonwoven strips.

2. The cleaning wipe according to claim 1, wherein said central bonded portion comprises thermal bonds.

3. The cleaning wipe according to claim 2, wherein said central bonded portion comprises chemical bonds.

4. The cleaning wipe according to claim 1, wherein said first nonwoven is gate folded and comprises a first nonwoven main portion that extends across said longitudinal axis, a pair of first nonwoven fold lines on opposite sides of said longitudinal axis, and a pair of first nonwoven gate portions each of which extend from one of said first nonwoven fold lines towards said central bonded portion and are bonded to said first nonwoven main portion.

5. The cleaning wipe according to claim 4, wherein said first nonwoven gate portions are between said first nonwoven main portion and said second nonwoven.

6. The cleaning wipe according to claim 5, wherein parts of said first nonwoven gate portions adjacent said first nonwoven fold line and said first nonwoven main portion are unbonded to one another.

7. The cleaning wipe according to claim 1, wherein said second nonwoven is gate folded and comprises a second nonwoven main portion that extends across said longitudinal axis, a pair of second nonwoven fold lines on opposite sides of said longitudinal axis, and a pair of second nonwoven gate portions, each of which extend from one of said second nonwoven fold lines towards said central bonded portion and are bonded to said second nonwoven main portion.

8. The cleaning wipe according to claim 7, wherein said second nonwoven gate portions each extend to an individual second nonwoven gate portion end, wherein parts of said second nonwoven gate portions adjacent said second nonwoven fold lines and said second nonwoven main portion are unbonded to one another.

9. The cleaning wipe according to claim 1, wherein said third nonwoven strips extend further away from said longitudinal axis than said second nonwoven strips.

10. The cleaning wipe according to claim 9, wherein said third nonwoven is gate folded and comprises a third nonwoven main portion that extends across said longitudinal axis, a pair of third nonwoven fold lines on opposite sides of said longitudinal axis, and a pair of third nonwoven gate portions each of which extend from one of said third nonwoven fold lines towards said central bonded portion and are bonded to said third nonwoven main portion.

11. The cleaning wipe according to claim 10, wherein said third nonwoven gate portions are bonded to said third nonwoven main portion at positions on opposite sides of and away from said longitudinal axis.

12. The cleaning wipe according to claim 11, wherein said third nonwoven gate portions each extend to an individual third nonwoven gate portion end, wherein parts of said third nonwoven gate portions adjacent said third nonwoven fold lines and said third nonwoven main portion are unbonded to one another.

13. The cleaning wipe according to claim 1, wherein said fourth nonwoven is gate folded and comprises a fourth nonwoven main portion that extends across said longitudinal axis, a pair of fourth nonwoven fold lines on opposite sides of said longitudinal axis, and a pair of fourth nonwoven gate portions each of which extend from one of said fourth nonwoven fold lines towards said central bonded portion and are bonded to said fourth nonwoven main portion.

14. The cleaning wipe according to claim 13, wherein said fourth nonwoven gate portions are bonded to said fourth nonwoven main portion at positions on opposite sides of and away from said longitudinal axis.

15. The cleaning wipe according to claim 1, wherein said first nonwoven strips have a first color and said second nonwoven strips have a second color, wherein said first color differs from said second color.

16. The cleaning wipe according to claim 1, wherein more than about 10% by number of said second nonwoven strips are twisted so that said second nonwoven free ends are out of plane relative to said second nonwoven fixed ends and are above said first nonwoven free ends.

17. A cleaning wipe having a longitudinal axis extending between opposing transverse edges that cross said longitudinal axis and longitudinal edges spaced apart from said longitudinal axis and extending between said transverse edges, wherein said cleaning wipe comprises:

a first nonwoven extending along said longitudinal axis and comprising a plurality of first nonwoven strips extending from first nonwoven fixed ends, wherein said first nonwoven fixed ends are oriented towards said longitudinal axis;

a second nonwoven extending along said longitudinal axis, wherein said second nonwoven is joined to said first nonwoven along a central bonded portion and comprises a plurality of second nonwoven strips extending from second nonwoven fixed ends to second nonwoven free ends, wherein said second nonwoven fixed ends are oriented towards said longitudinal axis, wherein along said central bonded portion said second nonwoven is below said first nonwoven;

a third nonwoven extending along said longitudinal axis, wherein said third nonwoven is joined directly or indirectly to said second nonwoven along said central bonded portion and comprises a plurality of third nonwoven strips extending from third nonwoven fixed ends, wherein said third nonwoven fixed ends are oriented towards said longitudinal axis, and wherein along said central bonded portion said second nonwoven is between said first nonwoven and said third nonwoven; and a fourth nonwoven extending along said longitudinal axis, wherein said fourth nonwoven is joined to said third nonwoven along said central bonded portion and comprises a plurality of fourth nonwoven strips extending from fourth nonwoven fixed ends, wherein said fourth nonwoven fixed ends are oriented towards said longitudinal axis L, and wherein along said central bonded portion said third nonwoven is between said second nonwoven and said fourth nonwoven, wherein said fourth nonwoven is further joined to said third nonwoven by a pair of outboard bonds that are outboard of said central bonded portion on opposite sides of said longitudinal axis, wherein said outboard bonds extend between said transverse edges;

wherein said second nonwoven strips are interlaced with said first nonwoven strips; wherein more than about 10% by number of said second nonwoven strips are bent so that said second nonwoven free ends are out of plane relative to said second nonwoven fixed ends and are above said first nonwoven free ends.

18. The cleaning wipe according to claim 17, wherein said first nonwoven is gate folded and comprises a first nonwoven main portion that extends across said longitudinal axis, a pair of first nonwoven fold lines on opposite sides of said longitudinal axis, and a pair of first nonwoven gate portions each of which extend from one of said first nonwoven fold lines towards said central bonded portion and are bonded to said first nonwoven main portion.

* * * * *